United States Patent
Mawle et al.

(10) Patent No.: US 6,773,325 B1
(45) Date of Patent: *Aug. 10, 2004

(54) TOY FIGURE FOR USE WITH MULTIPLE, DIFFERENT GAME SYSTEMS

(75) Inventors: Miriam Mawle, Virginia Water (GB); David Lewinsky, Cincinnati, OH (US); Franklin Labarbara, Rumford, RI (US); David L. Peterson, East Greenwich, RI (US); Mark Wiesenhahn, Milton, MA (US); Todd Rywolt, Cincinnati, OH (US); Victoria M. Stratford, Seekonk, MA (US); R. J. Sheppard, Providence, RI (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/067,973

(22) Filed: Feb. 8, 2002

Related U.S. Application Data

(63) Continuation-in-part of application No. 09/556,839, filed on Apr. 21, 2000, which is a continuation-in-part of application No. 09/520,148, filed on Mar. 7, 2000, now abandoned.

(51) Int. Cl.$^7$ ............................................. A63H 30/00
(52) U.S. Cl. ..................................... 446/175; 446/298
(58) Field of Search ............................. 463/36–39, 46; 446/301, 298, 175

(56) References Cited

U.S. PATENT DOCUMENTS

| | | | |
|---|---|---|---|
| 4,359,220 A | 11/1982 | Morrison et al. | 273/1 E |
| 4,516,260 A | 5/1985 | Breedlove et al. | 381/51 |
| 4,840,602 A | 6/1989 | Rose | 446/175 |
| 4,848,767 A | 7/1989 | Correro | 273/13 A |
| 5,013,047 A | 5/1991 | Schwab | 273/238 |
| 5,129,654 A | 7/1992 | Bogner | 273/238 |
| 5,184,830 A | 2/1993 | Okada et al. | 273/433 |
| 5,188,368 A | 2/1993 | Ryan | 273/237 |
| 5,249,806 A | 10/1993 | Nathanson | 273/238 |
| 5,417,421 A | 5/1995 | Bagley | 273/108 |
| 5,428,528 A | 6/1995 | Takenouchi et al. | 364/410 |
| 5,460,381 A | 10/1995 | Smith et al. | 273/238 |
| 5,664,157 A | 9/1997 | Takahira et al. | 395/500 |
| 5,702,305 A | 12/1997 | Norman et al. | 463/42 |
| 5,727,230 A | 3/1998 | Fujioka | 395/825 |
| 5,738,583 A | 4/1998 | Comas et al. | 463/40 |
| 5,743,796 A | 4/1998 | Orak et al. | 463/9 |
| 5,746,602 A | 5/1998 | Kikinis | 434/169 |
| 5,752,880 A | 5/1998 | Gabai et al. | 463/1 |
| 5,766,077 A | 6/1998 | Hongo | 463/30 |
| 5,810,666 A | 9/1998 | Mero et al. | 463/42 |
| 5,853,327 A | * 12/1998 | Gilboa | 463/39 |
| 5,855,513 A | 1/1999 | Lam | 463/9 |
| 5,873,765 A | 2/1999 | Rifkin et al. | 446/301 |
| 5,882,007 A | 3/1999 | Gay | 273/108.1 |
| 5,961,386 A | 10/1999 | Sawaguchi | 463/43 |
| 5,971,855 A | 10/1999 | Ng | 463/42 |
| 5,976,018 A | * 11/1999 | Druckman | 463/47 |
| 6,012,961 A | 1/2000 | Sharpe, III et al. | 446/298 |

(List continued on next page.)

*Primary Examiner*—John M. Hotaling, II
(74) *Attorney, Agent, or Firm*—Fish & Richardson P.C.

(57) ABSTRACT

A game includes a toy figure that includes memory for storing information relating to the toy figure, a first game system configured to communicate with the toy figure, and a second game system configured to communicate with the toy figure. The first game system is configured to download the stored information relating to the toy figure, receive input from a user, and alter the stored information based on the received input and the downloaded information. Similarly, the second game system is configured to download the stored information relating to the toy figure, receive input from a user, and alter the stored information based on the received input and the downloaded information. The second game system provides a play pattern substantially different from a play pattern provided by the first game system.

33 Claims, 28 Drawing Sheets

U.S. PATENT DOCUMENTS

| | | | | |
|---|---|---|---|---|
| 6,042,478 A | | 3/2000 | Ng | 463/44 |
| 6,083,104 A | * | 7/2000 | Choi | 463/6 |
| 6,120,379 A | | 9/2000 | Tanaka et al. | 463/44 |
| 6,159,101 A | | 12/2000 | Simpson | 463/46 |
| 6,165,068 A | | 12/2000 | Sonoda et al. | 463/8 |
| 6,190,174 B1 | * | 2/2001 | Lam | 434/169 |
| 6,213,871 B1 | | 4/2001 | Yokoi | 463/7 |
| 6,227,966 B1 | | 5/2001 | Yokoi | 463/1 |
| 6,253,058 B1 | | 6/2001 | Murasaki et al. | 434/308 |
| 6,267,678 B1 | | 7/2001 | Kubo et al. | 463/44 |
| 6,306,036 B1 | | 10/2001 | Burns et al. | 463/31 |
| 6,314,483 B1 | | 11/2001 | Goto et al. | 710/107 |
| 6,380,844 B2 | | 4/2002 | Pelekis | 340/5.8 |

* cited by examiner

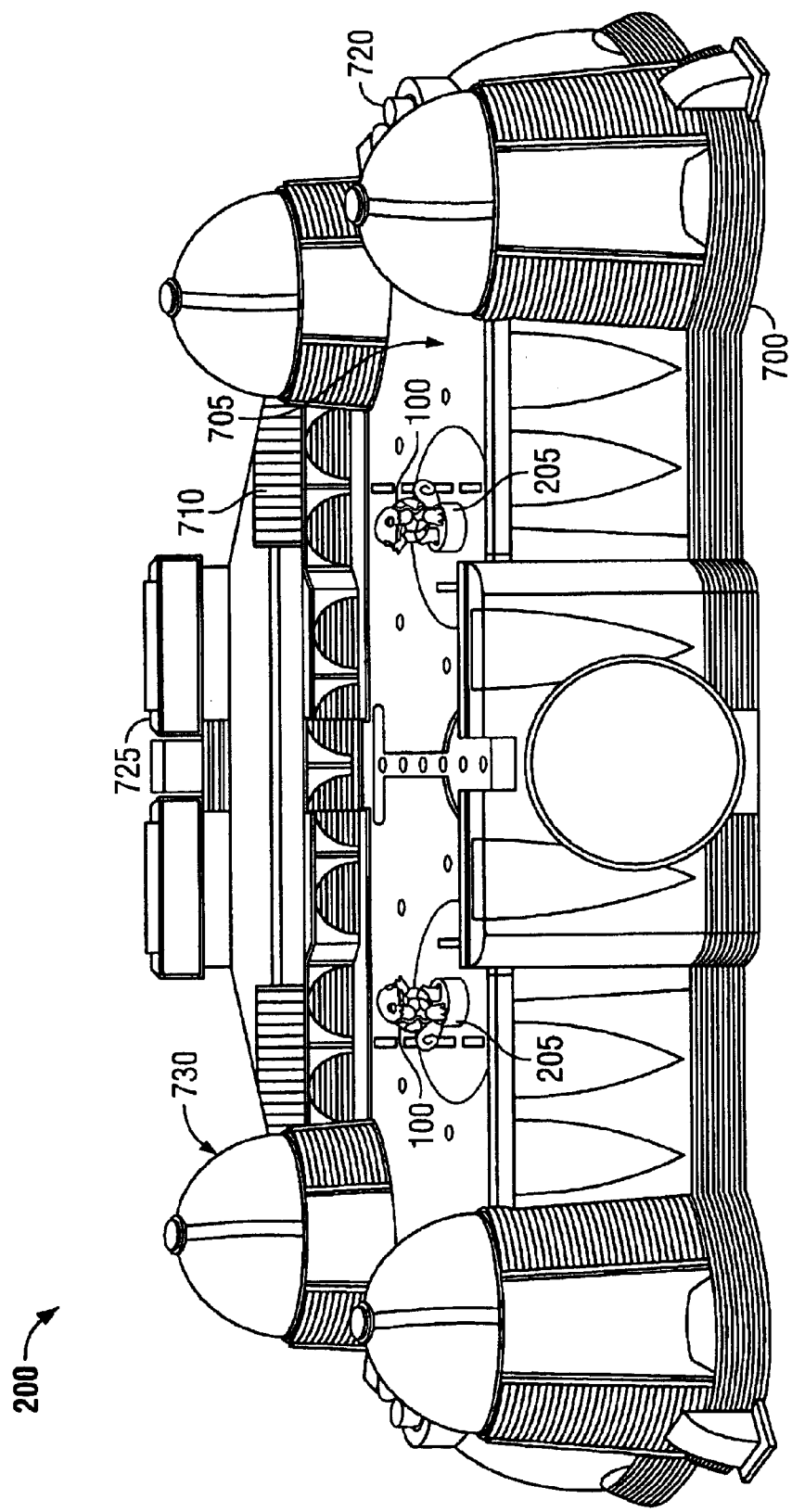

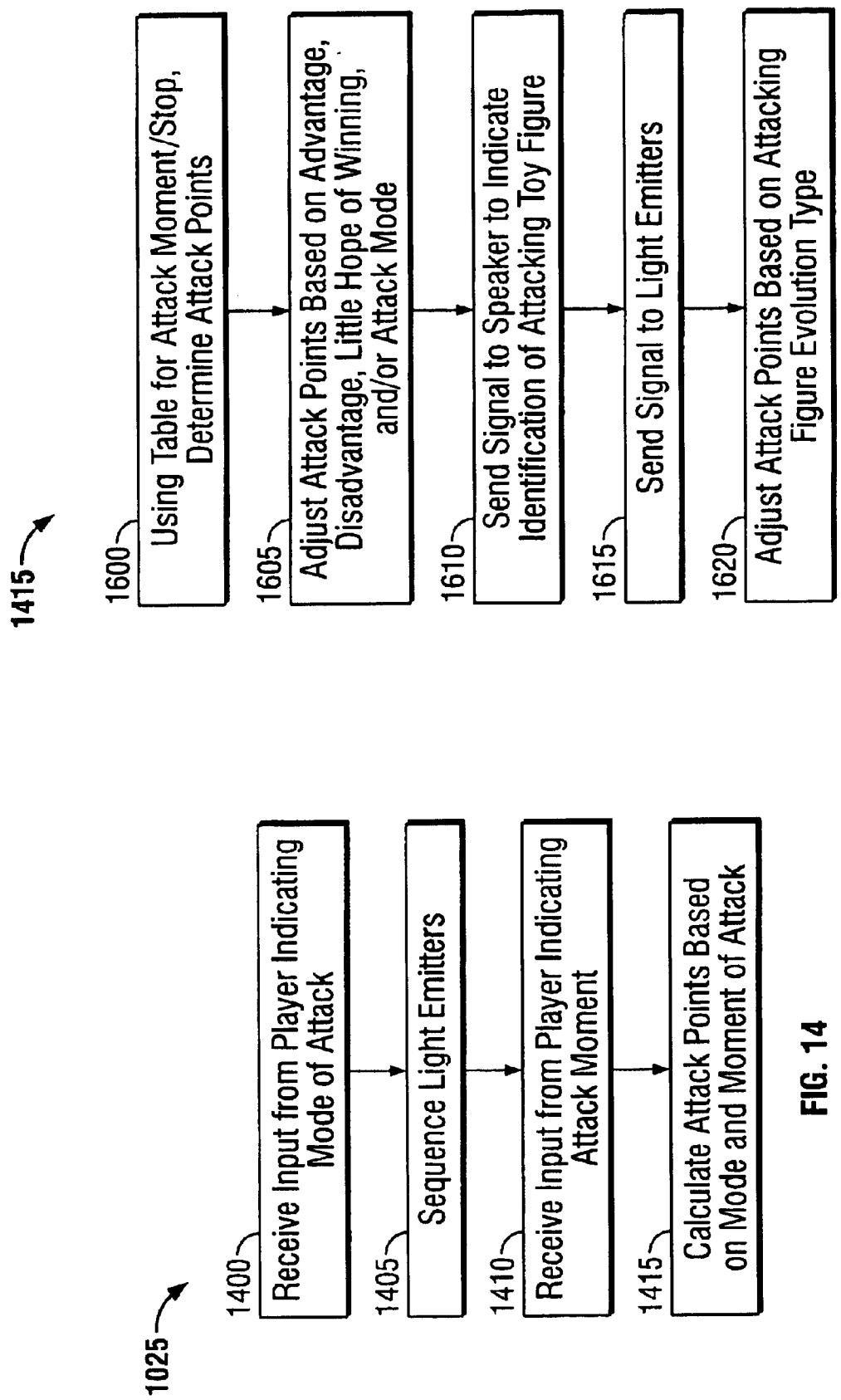

| Pass # | Attack Mode Light Points | | | | |
|---|---|---|---|---|---|
| | 100% (Center) | 70% (One Out) | 50% (Two Out) | 20% (Three Out) | 10% (Four Out) |
| Fast 1 | 100 | 70 | 50 | 20 | 10 |
| 2 | 90 | 63 | 45 | 18 | 9 |
| 3 | 80 | 56 | 40 | 16 | 8 |
| 4 | 70 | 49 | 35 | 14 | 7 |
| 5 | 60 | 42 | 30 | 12 | 6 |
| 6 | 50 | 35 | 25 | 10 | 5 |
| 7 | 40 | 28 | 20 | 8 | 4 |
| 8 | 30 | 21 | 15 | 6 | 3 |
| Slow 9 | 20 | 14 | 10 | 4 | 2 |
| Times Out After 6 More Cycles | | | | | |

"A" MEANS ATTACKING POWER HAS THE ADVANTAGE.
"D" MEANS ATTACKING POWER HAS THE DISADVANTAGE.
"X" MEANS ATTACKING POWER HAS THE LITTLE HOPE OF WINNING.

| ATTACKING \ DEFENDING | FIRE | WATER | ELECTRIC | GRASS | ICE | FIGHTING | POISON | GROUND | FLYING | PSYCHIC | BUG | ROCK | GHOST | DRAGON |
|---|---|---|---|---|---|---|---|---|---|---|---|---|---|---|
| NORMAL 1 |  |  |  |  |  |  |  |  |  |  | D |  |  |  |
| NORMAL 2 |  |  |  |  |  |  | A | A | D | D | D | A | X |  |
| FIRE | D | D |  | A | A |  |  |  |  |  | A |  |  | D |
| WATER | A | D |  | D |  |  |  | A |  |  |  | A |  | D |
| ELECTRIC |  | A | D | D |  |  |  | X | A |  |  |  |  | D |
| GRASS | D | A |  | D |  |  | D | A | D |  | D | A |  | D |
| ICE |  | D |  | A | D |  |  | A | A |  |  |  |  | A |
| FIGHTING | A |  |  |  | A |  | D |  | D | D | D | A | X |  |
| POISON |  |  |  | A |  |  | D | D |  |  | A | D | D |  |
| GROUND | A |  | A | D |  |  | A |  | X |  | D | A |  |  |
| FLYING |  |  | D | A |  | A |  |  |  |  | A | D |  |  |
| PSYCHIC |  |  |  |  |  | A | A |  |  | D |  |  |  |  |
| BUG | D |  |  | A |  | D | A |  | D | A |  |  | D |  |
| ROCK | A |  |  |  | A | D |  | D | A |  | A |  |  |  |
| GHOST |  |  |  |  |  |  |  |  |  | A |  |  | D |  |
| DRAGON |  |  |  |  |  |  |  |  |  |  |  |  |  | A |

TOY FIGURE FOR USE WITH MULTIPLE, DIFFERENT GAME SYSTEMS

CROSS REFERENCE TO RELATED APPLICATION

This is a continuation-in-part of U.S. application Ser. No. 09/556,839, filed Apr. 21, 2000, which was a continuation-in-part of U.S. application Ser. No. 09/520,148, filed Mar. 7, 2000 now abandoned, both of which are incorporated herein by reference.

TECHNICAL FIELD

This invention relates to a toy figure that can be used with multiple, different game systems.

BACKGROUND

It is known to use interactive toys in conjunction with a game system. For example, it is known to use three-dimensional toy bodies in conjunction with a video game system, such that characters corresponding to the toy bodies are displayed on a monitor of the video game system.

SUMMARY

In one general aspect, the invention provides a game that includes a toy figure having memory for storing information relating to the toy figure, a first game system configured to communicate with the toy figure, and a second game system configured to communicate with the toy figure. Each of the game systems is configured to download the stored information relating to the toy figure, receive input from a user, and alter the stored information based on the received input and the downloaded information. The second game system provides a play pattern substantially different from a play pattern provided by the first game system.

Embodiments may include one or more of the following features. For example, in addition to alterable memory, the memory in the toy figure may include read only memory.

Communication between the toy figure and a game system may be achieved through a direct connection between a connector on the toy figure and a mating connector on the game system. Communication also may include wireless communication between the toy figure and the game system. Communication between the game system and the toy figure also may employ inductive or capacitive coupling.

Information relating to the toy figure may include statistics of past games in which the toy figure was involved, gaming rules, a name of the toy figure, one or more visual representations of the toy figure, and/or one or more audio representations of the toy figure. Information relating to the toy figure also may include a power type that indicates how powerful that toy figure is when interacting with a game system or another toy figure, a weakness type that indicates how weak that toy figure is when interacting with a game system or another toy figure, or a resistance type that indicates how resistant that toy figure is to damage when interacting with a game system or another toy figure.

A game system may adjust game play using the toy figure based on the downloaded information relating to that toy figure. Input received from a user may include input relating to control of the toy figure during game play.

A game system may include, for example, a game arena, hand-held electronic device, a game board, a video game, a software game, an arcade game, or a network-based game. Alternatively, a game system may include a race track, and the toy figure may include a vehicle that traverses the race track. The race track may be a physical race track or an electronic or software representation of such a race track.

The game may include one or more other game systems, with each of the other game systems being configured to electronically couple to the toy figure and to download the stored information relating to the toy figure. The games system also may be configured to receive input from the user and alter the stored information based on the received input and the download information. Each game system provides a play pattern substantially different from a play pattern provided by the other game systems.

Received user input may include an indication of an action that the toy figure is to take during a game.

The game may include another toy figure having memory for storing information relating to the other toy figure. Each of the game systems may be configured to communicate with the other toy figure, download the stored information relating to the other toy figure, receive input from a user, and alter the stored information in the other toy figure based on the received input from the user and the downloaded information. A game system may be configured to perform game tasks based on the received user input, the downloaded information, and the play pattern of that game system.

A game system may include a processor, and a display that displays, under control of the processor, a visual representation of a toy figure coupled to the game system, with the visual representation being downloaded to the game system. A game system also may include a processor, and a speaker that emits, under control of the processor, an audio representation of a toy figure coupled to the game system, with the audio representation being downloaded to the game system. A game system may include a processor, memory, a clock, and a counter, with the processor causing the game system to perform various tasks based on the play pattern, and additional information obtained from memory, the clock, and the counter.

At least one of the game systems may cause the toy figure to move or emit one or more sounds.

The toy figure may be, for example, a three-dimensional representation of a character or a vehicle. The toy figure may include a code that uniquely identifies the particular toy figure. The unique code may be formed on a body of the toy figure, or may be stored in memory of the toy figure.

The game permits a toy figure to interact with two or more game systems. Each game system stores information relating to the toy figure in memory in the toy figure. Thus, results of a game in which the toy figure is engaged may be used to modify the characteristics of that toy figure. When the toy figure is engaged with another game system, those characteristics may be downloaded into the other game system. This permits the toy figure to retain its characteristics from one game system to the next, which provices for more interesting and exciting game play.

Other features and advantages will be apparent from the following description, including the drawings, and from the claims.

DESCRIPTION OF DRAWINGS

FIGS. 2–4 are perspective views of different game systems with which the toy figure of FIG. 1 can be used.

FIGS. 10–14, 16, 18, and 19 are flow charts of procedures performed by the game system of FIG. 2.

FIG. 15 is a table showing various attack point totals for a toy figure used with the game system of FIG. 2.

FIG. 17 is a table showing various attacking powers of an attacking toy figure used with the game system of FIG. 2.

DETAILED DESCRIPTION

Figure 1:
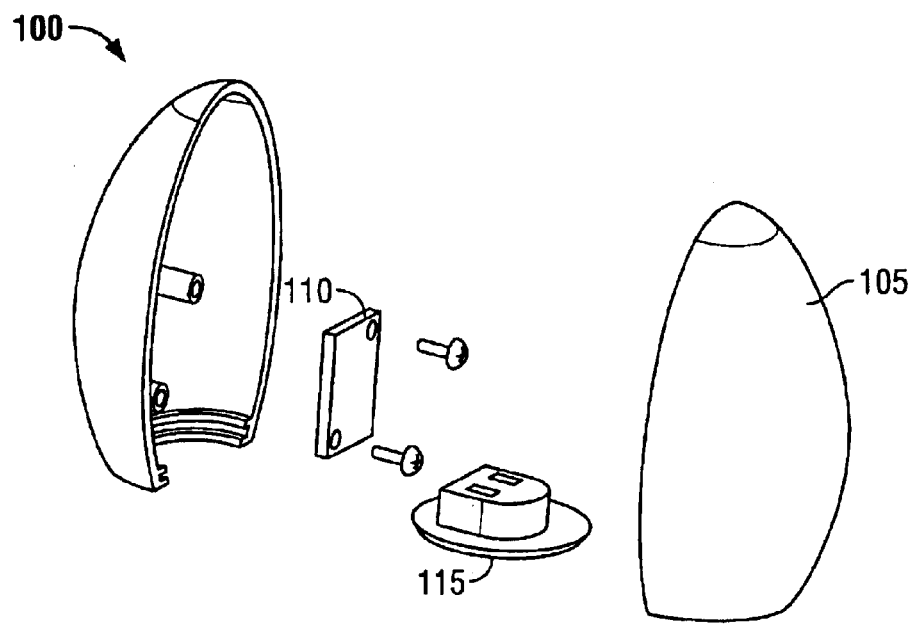
FIG. 1 is an exploded perspective view of a toy figure for use with multiple, different game systems.

Referring to FIG. 1, a toy figure 100 includes a three-dimensional body 105 made of a durable, safe, and inexpensively fabricated material, such as, for example, plastic. The toy figure 100 also includes an integrated circuit 110 including nonvolatile, re-writeable memory, read only memory, and support circuitry. The toy figure 100 further includes a connector 115 that is electrically connected to the integrated circuit 110. Although shown in a general form, the toy figure 100 may be decorated with features or may have a more complex shape. For example, the toy figure 100 may resemble a blue dragon with a white tail.

Characteristics of the toy figure 100 are stored in the integrated circuit 110. Characteristics include results of past games in which the toy figure 100 was involved, gaming rules, a unique identification for the toy figure, visual and/or audio representations of the toy figure, and attributes of the toy figure. A visual representation of the toy figure may be, for example, that it represents a yellow monster that is four feet tall and has green eyes. An audio representation of the toy figure may be, for example, a voice attributed to that particular toy figure.

Attributes of the toy figure 100 may include, for example, power type, evolution type, name, weakness type, resistance type, skills, amount of energy required for play, attack methods, available weapons, intelligence, damage that the toy figure can withstand (called hit total), number of survived attacks, and other game statistics. The toy figure 100 further includes a connector 115 that is electrically connected to the memory 110.

The toy figure 100 is adapted to mate with an electronic game system to permit interaction between the toy figure 100 and the electronic game system. Referring also to FIGS. 2–4, 25, and 28A, the toy figure 100 may interact with different electronic game systems, respectively, 200, 300, 400, 2500, and 2800. Interaction between the electronic game systems 200, 300, 400, 2500, 2800 and the toy figure 100 is achieved through an electrical connection between the connector 115 on the toy figure 100 and a corresponding mating connector 205, 305, 405, 2505, and 2805 on the respective electronic game systems 200, 300, 400, 2500, and 2800.

As discussed in more detail below, FIG. 2 shows a game arena 200 in which opposing toy figures 100 engage in a battle. The toy figures 100 are placed into the game arena 200 at predetermined locations, thus permitting the game arena 200 to access memory stored in the integrated circuit 110 of the toy figures 100. During battle, a player can choose an attack strategy based on each toy figure's characteristics and identification. The goal is to exact a predetermined minimum amount of damage to the opposing player's toy figure, thus effectively "knocking out" the opposing player's toy figure. After a battle, the game arena may store statistics relating to the results of such battles into the memory in the integrated circuit 110 of each toy figure 100.

Figure 3:
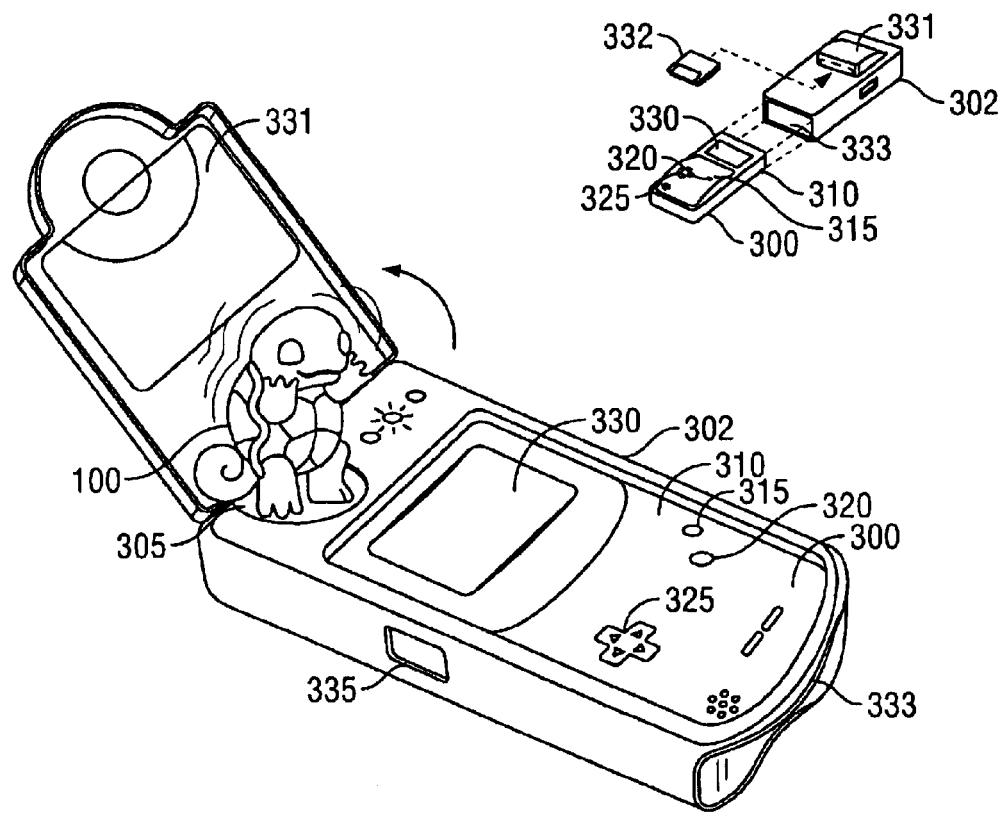

FIG. 3 shows a hand-held electronic game device 300 in which a player can attach his/her toy figure 100 to an adapter 302 for use with the game device 300. In FIG. 3, the toy figure 100 is shaped like a turtle. The game device 300 downloads information stored in the toy figure's memory in the integrated circuit 110 through a connector 304 and adjusts game play accordingly. When a game is completed, the game device 300 may upload statistics relating to results of the game into the memory in the integrated circuit 110 of the attached toy figure 100 through the connector 304.

Figure 4:
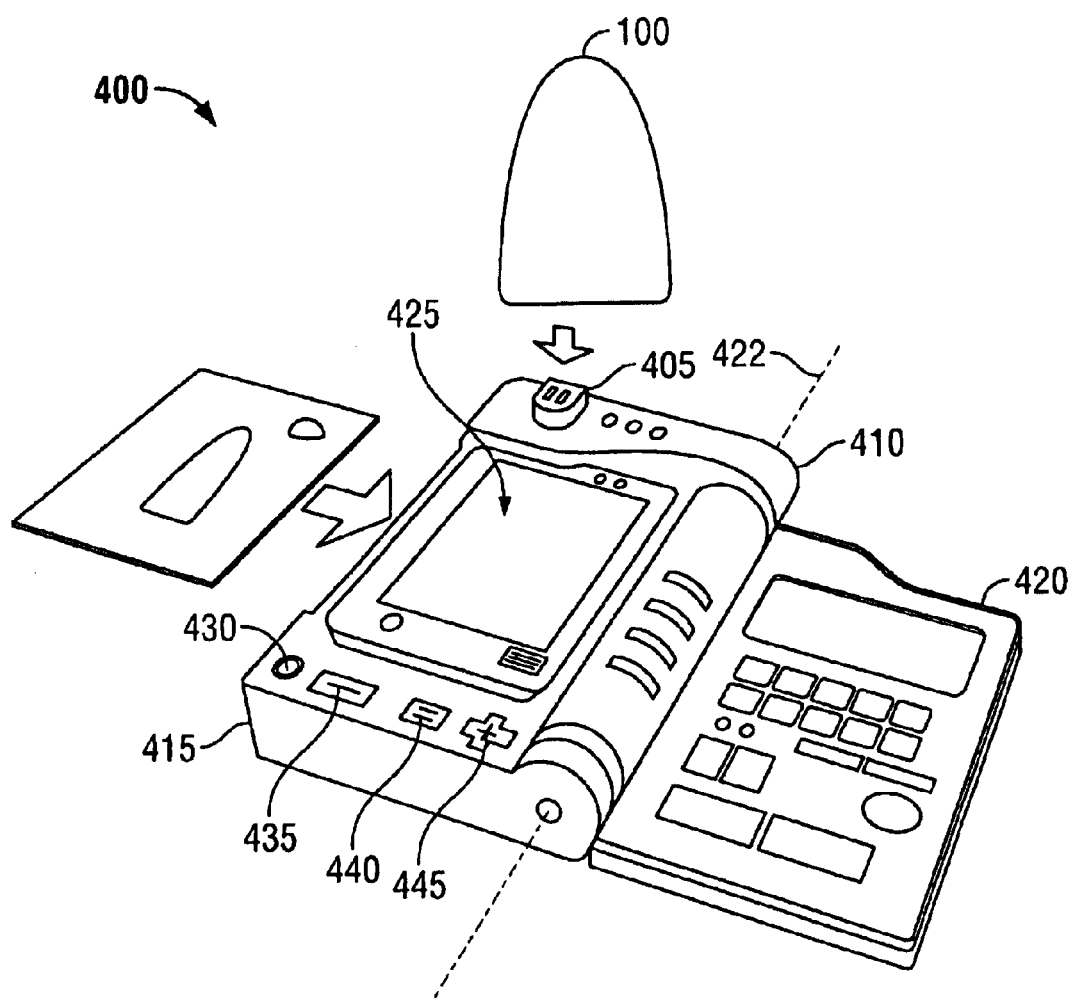

As shown in FIG. 4 a user can attach his/her toy figure to a reading/training device 400 when the user wishes to learn more about that toy figure. For example, the user may wish to determine a name of the toy figure, or a number of victories associated with a toy figure. The user may also use the reading/training device 400 to train for battles or games that involve use of the toy figures 100. Moreover, after training using the reading/training device 400, the user could adjust characteristics of a toy figure based on the amount of knowledge that the user has gained about games, battles, and toy figures.

Figure 6:
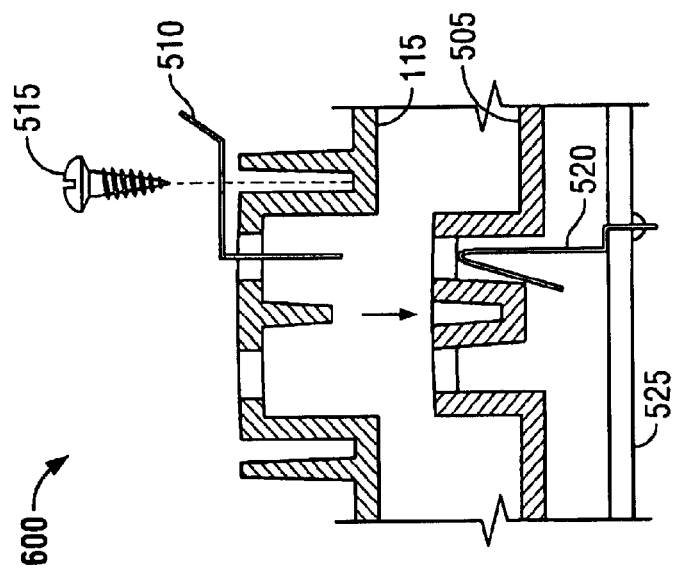
FIG. 6 is a side cross-sectional view of the connection between the toy figure of FIG. 1 and a game system.
Figure 5:
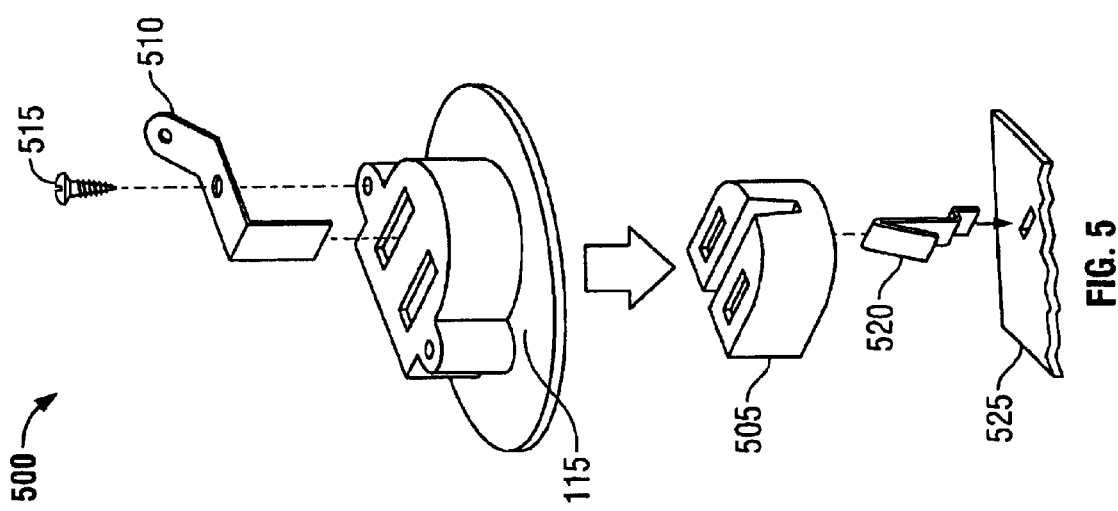
FIG. 5 is an exploded perspective view of the connection between the toy figure of FIG. 1 and a game system.

Referring also to FIGS. 5 and 6, an exploded perspective view 500 and a cross-sectional view 600 of the connection between the toy figure connector 115 and a game system connector 505 detail how the connectors 115, 505 mate with each other. The toy figure connector 115 may be a D-shaped receptacle made of a durable plastic material. Similarly, the game system connector 505 may be a D-shaped mating post made of a durable plastic material.

Within the toy figure 100, a contact 510 that is electrically coupled to the memory 110 of the toy figure is guided through and secured to the connector 115 using a fastener 515 (for example, a screw or solder joint). A contact 520 is electrically coupled to a controller 525 within the game system. The contact 520 is secured within a portion of the connector 505 that aligns with the contact 510 in the toy figure connector 115 when the connectors 115, 505 mate with each other.

In general, the toy figure 100 is adapted to interface with any number of electronic game systems. When a user purchases the toy figure 100, the memory 110 may include a set of predetermined attributes and an identification (such as an alphanumeric code) unique to that toy figure 100. As the user plays with the toy figure 100 using any one of the electronic game systems, characteristics and attributes for the toy figure 100 may be revised based on the performance of the toy figure 100. As the characteristics and attributes of the toy figure 100 are revised, the electronic game system may store the revised characteristics and attributes into memory 110.

The player who controls a particular toy figure makes decisions during game play based on that particular toy figure's attributes and the opposing toy figure's attributes. In one implementation, the power type attribute of the toy figure 100 generally indicates what kind of power the toy figure 100 possesses. For example, if the toy figure possesses a fire power type, the toy figure 100 uses fire in attacking opposing toy figures. Similarly, the weakness type attribute of the toy figure 100 generally indicates what types of power the toy figure is weak against in a battle. For example, the fire power toy figure might be weak against a water power toy figure. In addition, attack methods are associated with the type of power that the toy figure possesses—for example, a fire power toy figure might throw fire during an attack, whereas a water power toy figure might throw water during an attack.

The resistance type attribute of the toy figure indicates what power types of attacking toy figures the toy figure is strong against. For example, the fire power toy figure may be strong or possess a resistance against a grass power toy figure.

The evolution type of the toy figure indicates whether the toy figure exhibits primitive (and/or weaker) powers or evolved (and/or stronger) powers. For example, when attacking an opposing toy figure, a primitive fire power toy figure may exact a relatively lower amount of damage to the opposing toy figure whereas an evolved fire power toy figure may exact a higher amount of damage to that same opposing toy figure. As another example, a primitive water power toy figure may attack with a simple strategy (such as, exact x amount of damage to opposing toy figure) whereas an evolved water power toy figure may attack with a more complex strategy (such as, exact x-y amount of damage to opposing toy figure, where y is the total amount of damage exacted on the attacking evolved water power toy figure). Moreover, some primitive toy figures may be predecessors to evolved toy figures; that is, an evolved toy figure is evolved from a particular predecessor toy figure.

Game Arena

Figure 7:
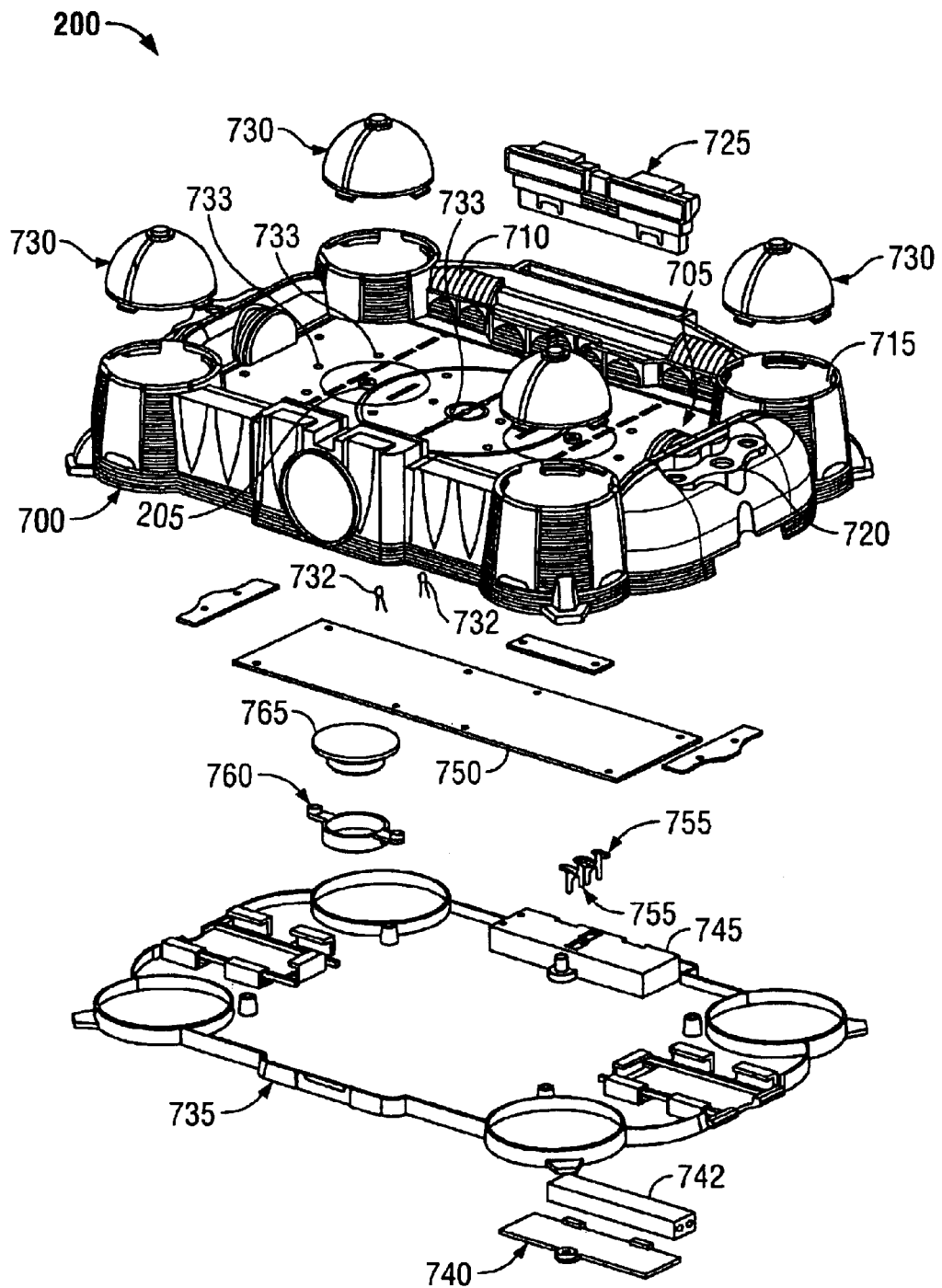
FIG. 7 is an exploded perspective view of the game system of FIG. 2.

Referring also to FIG. 7, the electronic game system may be the game arena 200 in which toy figures 100 engage in a battle. The game arena 200 includes connectors 205 on which the toy figures 100 are attached so that information may be exchanged between the toy figure 100 and the game arena 200. The game arena 200 includes a top piece 700 formed to resemble an arena or play area. The top piece 700 and all its accessories are made of rigid, safe, and durable materials such as, for example, plastic materials. Moreover, because the top piece 700 resembles a game arena, it may be decorated with paint, lights, and shapes to indicate such a resemblance. For example, the top piece 700 may include a court area 705 onto which the toy figures battle, a spectator area 710 that resembles seats in a stadium or arena, and a toy figure rest area 715 into which toy figures may be placed when not engaged in battle. The top piece 700 also includes a user control area 720 that enables a user to control actions of the toy figure. Additional decorative and functional accessories of the top piece include a scoreboard 725 that attaches to the spectator area 710 and a dome 730 that protects toy figures in the rest area 715. Light emitters 732 may be positioned along the court area 705 through corresponding holes or slots 733 formed into the court area 705.

The game arena 200 includes a bottom piece 735 that joins with the top piece 700 to form a cavity that holds various components of the game arena 200. The bottom piece 735 is also made of a rigid, safe, and durable material, such as a plastic material. The bottom piece 735 is joined to the top piece 700 using any suitable fastening technique, such as, for example, snap fit techniques and/or fasteners such as screws that align with threaded holes. Because the bottom piece 735 is not visible during game battle, it is not generally colored or decorated with accessories.

The bottom piece 735 includes a battery door 740 that opens for inserting a power source 742, such as a battery, into a battery box 745. A controller 750 is retained within the cavity formed by the top and bottom pieces: the controller may be retained by attachment to the battery box 745 using any suitable fastener 755, such as a screw that aligns with threaded holes in the battery box 745. The bottom piece 735 further includes a speaker mount 760 for retaining a speaker 765 that connects to the controller 750 within the cavity. A start button or switch (not shown) may be positioned below the power source box 745 or on an outside surface of the bottom piece 735.

Figure 8:
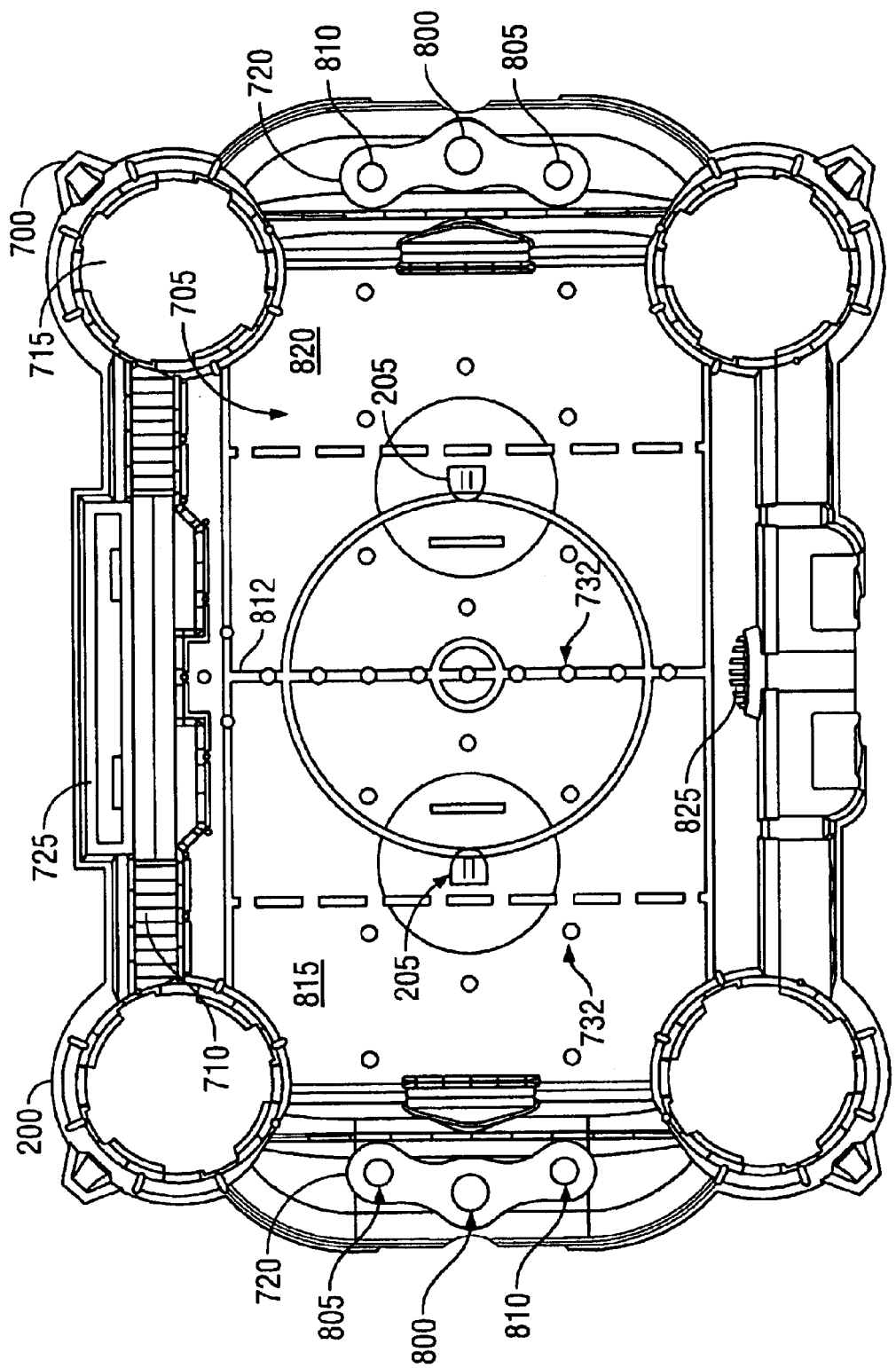
FIG. 8 is a top view of the game system of FIG. 2.

Referring also to FIG. 8, a top view of the game arena 200 shows more clearly the layout of the court area 705 and the user control area 720. The user control area 720 includes a fire or attack button 800, a normal mode button 805, and a special mode button 810. The light emitters 732 are arranged in the court area 705 along a centerline 812 that divides the court area 705 into two regions: a first region 815 and a second region 820. The light emitters 732 are also arranged in the court area 705 around each of the toy figures locations and in various other locations to facilitate game play. A first player faces a first user control area 720 that controls the toy figure 100 that is placed in the first region 815. A second player faces a second user control area 720 at the opposite end of the game arena 200, and which controls the toy figure 100 that is placed in the second region 820. The game arena 200 additionally includes a set of speaker slots or holes 825 that permit audio signals from the speaker 765 to freely emanate from the game arena 200.

Figure 9:
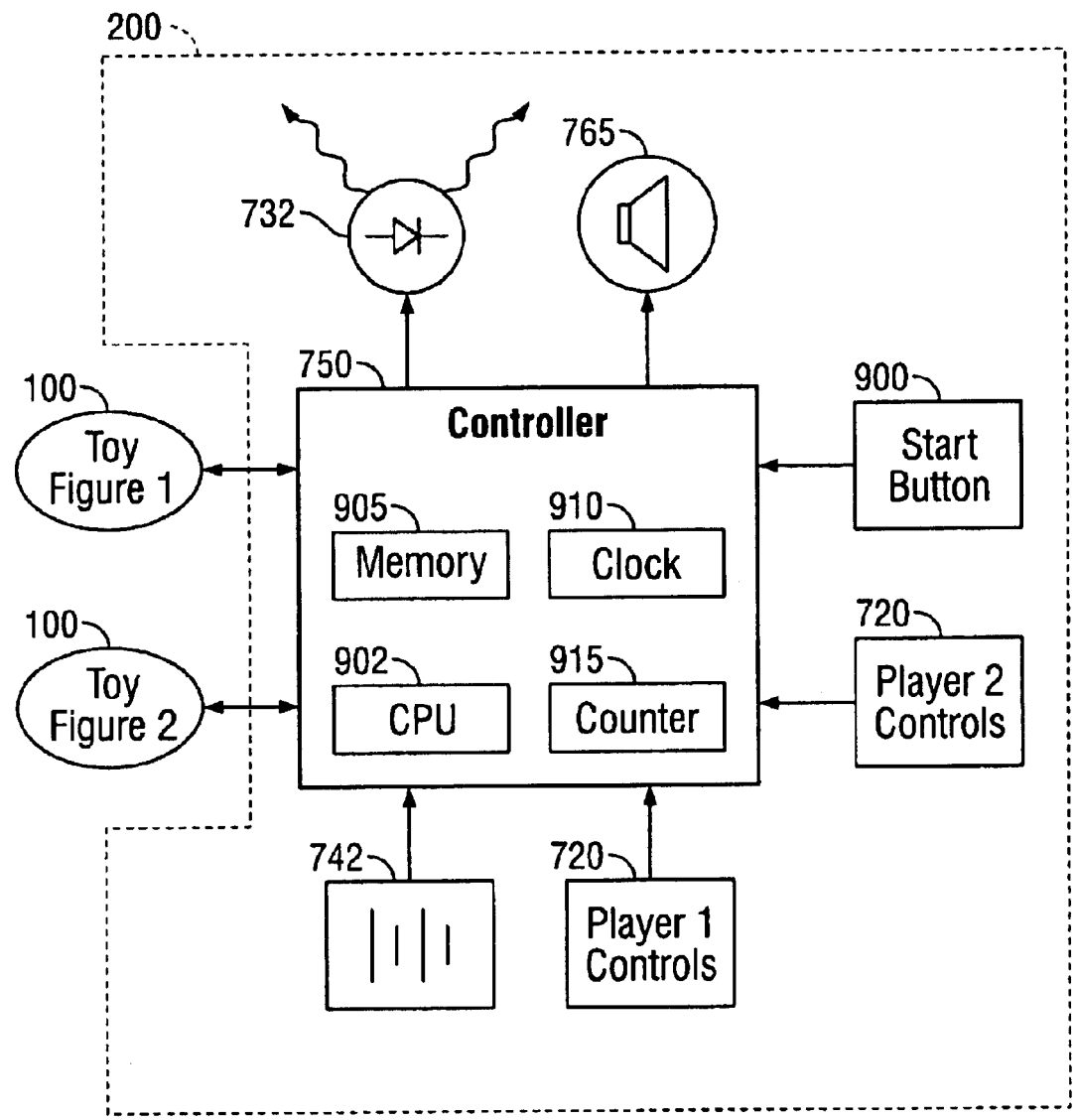
FIG. 9 is a block diagram of the game system of FIG. 2.

Referring also to FIG. 9, the game arena controller 750 receives power from the power source 742 and input from a first player's control area 720, a second player's control area 720, and the start button 900. Based on this input, the controller 750 performs various tasks using additional information obtained from a processor 902, memory 905, a clock 910, and a counter 915. As game play requires, the controller 750 may flash one or more light emitters 732, send a signal to the speaker 765 to cause the speaker to emit an audio signal, or update memory within either of the toy figures 100 connected to the game arena 200.

Figure 10:
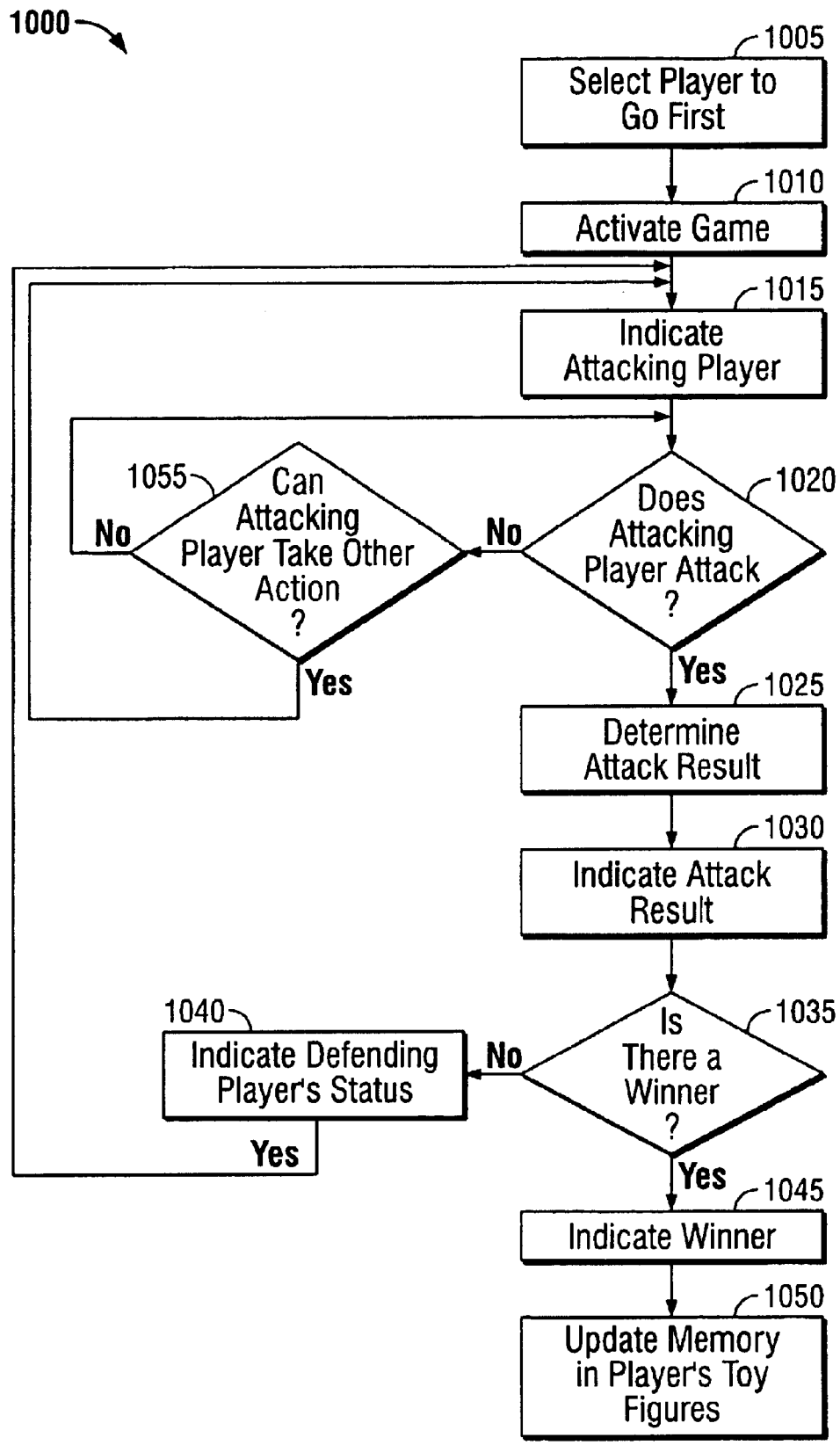
Figure 11:
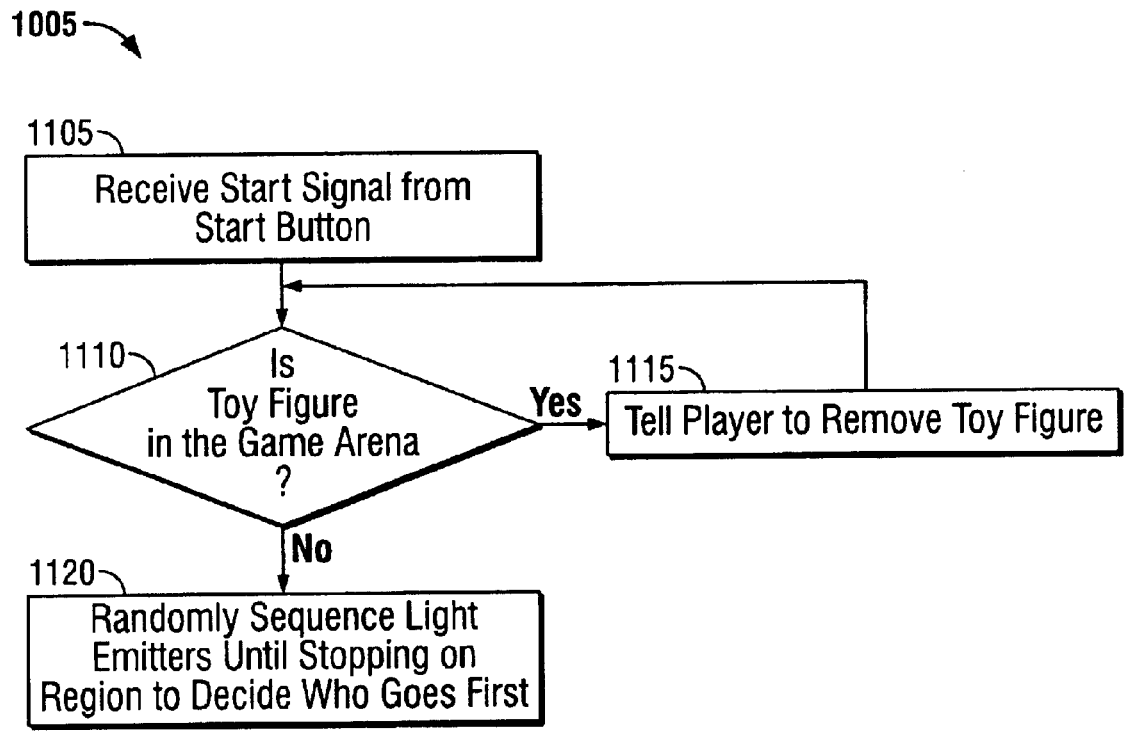

Referring also to FIGS. 10 and 11, during game play, the game arena controller 750 performs a procedure 1000 (FIG. 10). Initially, the controller 750 selects a player that will attack first in the game (step 1005). The controller 750 performs this selection according to a procedure 1005 that is shown in FIG. 11. In that procedure, the controller 750 receives a start signal from the start button 900 (step 1105), with the start signal indicating that the players want to begin a game. The controller 750 determines whether a toy figure 100 is connected to either of the connectors 205 on the game arena 200 (step 1110). If so, the controller 750 notifies that player to remove the toy figure from the game arena 200 by sending a signal to the speaker 765 that causes the speaker to emit an audio signal (step 1115). If both connectors 205 on the game arena 200 are free, then the controller 750 randomly sequences the light emitters on the court area 705 to indicate which player proceeds first (step 1120). For example, if the controller 750 ends the flashing at a light emitter in the first region 815, then the player controlling the first region would be the attacking player and would proceed first. Likewise, if the controller 750 ends the flashing at a light emitter in the second region 820, then the second player would be the attacking player and would proceed first.

Figure 12:
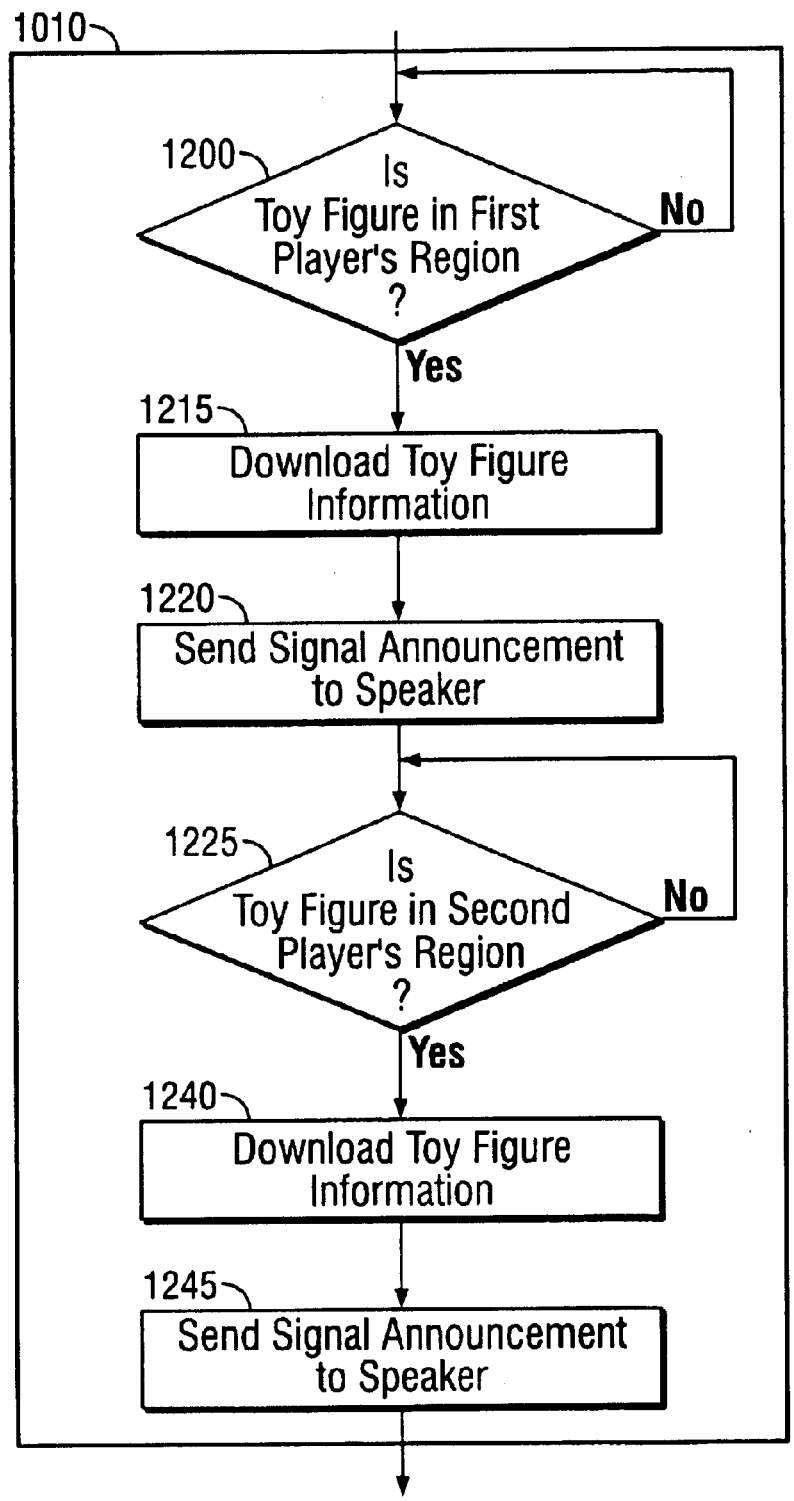

Referring again to FIG. 10, once the attacking player is selected, the controller 750 activates the game (step 1010). The controller 750 performs this activation according to the procedure 1010 shown in FIG. 12. Initially, the controller 750 determines whether the attacking player has connected a toy figure to the connector 205 in the attacking player's region (step 1200). If so, the controller 750 downloads information from the memory of the connected toy figure (step 1215). The controller 750 downloads, for example, the unique identification of the toy figure, the game rules, the toy figure attributes, visual and/or audio representations of the toy figure, and attributes of the toy figure. The controller 750 then sends a signal to the speaker 765 that causes the speaker to emit an announcement audio signal that indicates that the player has selected a toy figure (step 1220). The announcement may include a voice of the toy figure that speaks the name of the toy figure in addition to an indication of the damage exacted on the toy figure (for example, the indication may include the number of hits acquired by the toy figure).

Next, the controller 750 determines whether the defending player has connected a toy figure to the defending player's connector 205 (step 1225). If so, the controller 750 downloads information from the memory of the connected toy figure (step 1240). The controller 750 downloads, for example, the unique identification of the toy figure, the game rules, the toy figure attributes, visual and/or audio representations of the toy figure, and attributes of the toy figure. The controller 750 then sends a signal to the speaker 765 that causes the speaker to emit an audio announcement signal that indicates that the defending player has selected a toy figure (step 1245). The announcement may include a voice of the toy figure that speaks the name of the toy figure in addition to an indication of the damage exacted on the toy figure.

Figure 13:
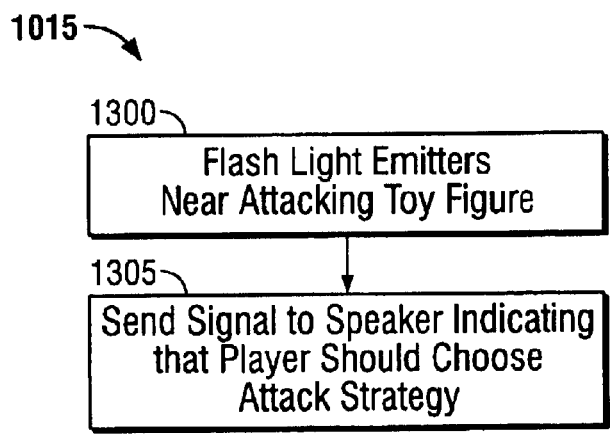

Referring again to FIG. 10, after the controller 750 has activated the game (step 1010), the controller 750 indicates the attacking player (step 1015). During the first iteration through the procedure, this will be the player selected to go first. In later iterations, this may be the other player. The controller performs this indication based on a procedure 1015 that is shown in FIG. 13. First, the controller 750 indicates which player is to attack by flashing the light emitters near that player's toy figure (step 1300) and causing the speaker 765 to emit an audio signal that indicates that the player should choose an attack strategy (step 1305). For example, the controller 750 may send a signal to the speaker 765 that causes the speaker 765 to emit the phrase "choose attack."

Referring again to FIG. 10, the controller 750 then determines whether the player who is poised to attack takes an attack action (step 1020). The player takes an attack action by pressing the attack button 800.

If the controller determines that the player attacks, then the controller 750 determines the result of the attack on the toy figures involved in the game (step 1025) by performing a procedure 1025 shown in FIG. 14. To determine the result of the attack, the controller 750 receives input from the player indicating the mode of attack (step 1400) through the attack mode buttons 805, 810. The controller 750 then sequences (initially, at a relatively high speed) the light emitters that run along the centerline 812 of the court area 705 (step 1405).

The player's goal is to stop the sequencing of the light emitters at a light emitter nearest the center of the court area 705, thus gaining the maximum attack power. The moment that the player stops the light emitter sequencing may be referred to as the attack moment. With every pass through the complete light emitter sequence, the controller 750 slows the sequencing down, thus making it easier for the player to stop the sequencing at the center light and gain the maximum attack power for that attack moment. However, as the sequencing is slowed, attack power is reduced overall because the attack moment is delayed. Referring also to FIG. 15, a table 1500 gives typical attack points 1505 versus sequence stop location 1510 and sequence attack moment 1515. For example, if the player stops the sequencing at the center light emitter during the first pass, then the controller would allocate the maximum number of attack points, 100, to that player's attack. However, if the player stops the sequencing at two light emitters from the center light emitter during a third pass, then the controller would allocate only 40 attack points to the player's attack.

The controller 750 receives input from the player indicating the attack moment (step 1410) through the attack button 800. Based on the attack moment and the mode of attack, the controller 750 calculates attack points (step 1415) to be imparted onto the opposing toy figure as a result of the attack.

Referring to FIG. 16, the controller 750 performs the calculation according to a procedure 1415. The controller 750 determines the attack points according to the attack moment and the stop position using, for example, table 1500 from FIG. 15 (step 1600).

Then, the controller 750 adjusts the attack point total based on attack mode, and/or relative attack advantages or disadvantages between toy figures involved in the battle (step 1605). For example, in determining the attack points, the controller 750 may determine whether the attacking player has selected a normal attack mode. The controller 750 may further or alternatively determine whether that player's toy figure has little hope of winning the attack against the other toy figure.

In addition to normal attacks, toy figures have special power attacks. As shown in table 1700 of FIG. 17, each toy figure has associated with it a normal power 1705 and a special power 1710. The special power 1710 may or may not have an advantage over the opposing toy figure's special power. Thus, when the toy figure attacks the opposing figure, the controller determines whether, based on the toy figures' powers, the toy figure would have an advantage over the opposing toy figure in the attack. For example, if the attacking toy figure is in a first normal attack mode (NORMAL 1), the attacking toy figure exhibits normal power against the opposing toy figure. Thus, referring to table 1700, if the opposing toy figure has water power, then neither toy figure would have an advantage during the ensuing attack. However, if the opposing toy figure has poison power, then the attacking toy figure would have an advantage over the opposing toy figure. Alternatively, if the attacking toy figure is in special power mode and the attacking toy figure exhibits a fighting power as its special power, then the attacking toy figure would have a disadvantage over an opposing toy figure with a bug power but would have little hope of winning an attack against an opposing toy figure with a ghost power.

Referring again to FIG. 16, if the attacking toy figure has little hope of winning the attack against the other toy figure, then the controller 750 removes points from the attack point total determined at step 1600. If the controller 750 determines that the attacking player has not selected a normal attack, and has instead selected a special power attack, then the controller determines whether the attacking toy figure has an advantage over the opposing toy figure using, for example, the table 1700 of FIG. 17.

If the toy figure has an advantage over the opposing toy figure, then the controller adds a predetermined number of points to the attack point total. If the toy figure does not have an advantage, and instead has a disadvantage over the opposing toy figure, then the controller subtracts a predetermined number of points from the attack point total. If the toy figure has no advantage or disadvantage, and instead has little hope of winning an attack against the opposing toy figure, then the controller subtracts a predetermined greater number of points from the attack point total.

Otherwise, the controller just proceeds to send a signal to the speaker 765 causing the speaker to emit an audio signal that indicates the name of the attacking toy figure (step 1610) and/or to send a signal to the light emitters around or very near the attacking toy figure to indicate that the toy figure is attacking (step 1615). The controller 750 then adjusts the attack points (step 1620) based on the evolution type for the attacking toy figure. For example, if the attacking toy figure has evolved from a primitive toy figure, then the controller would add a predetermined number of points to the attack points. If the attacking toy figure has evolved from an evolved toy figure, then the controller would add a second predetermined number of points to the attack points. Typically, the second predetermined number of points is greater than the predetermined number of points.

Figure 18:
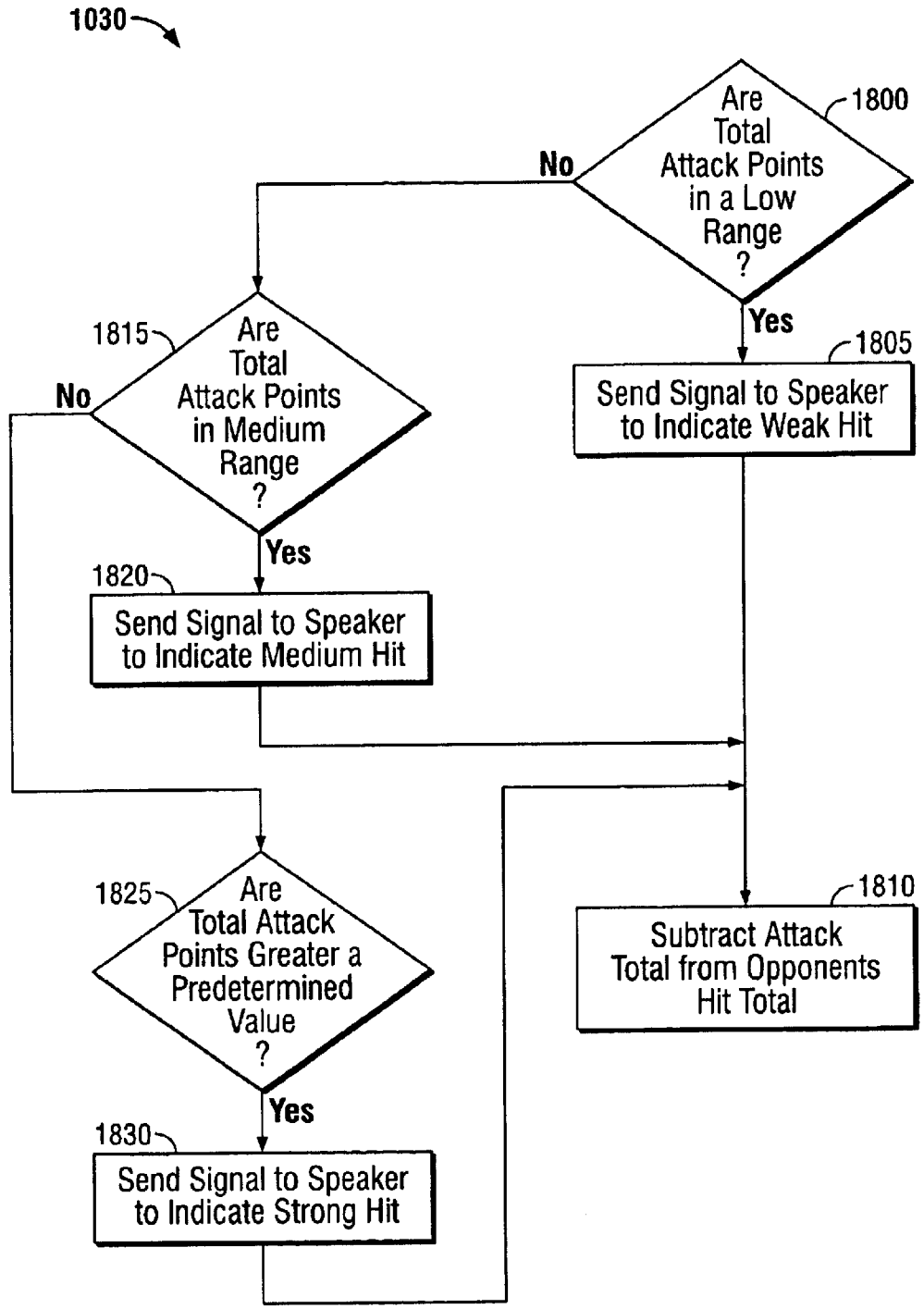

Referring again to FIGS. 14 and 10, after the controller determines the attack point total (step 1415) and the attack result (step 1025), the controller 750 indicates the attack result to the players (step 1030). Referring to FIG. 18, the controller 750 performs this indication according to a procedure 1030. The controller 750 first determines whether the attack point total falls within a lower range of predetermined values (step 1800), and, if so, the controller 750 sends a signal to the speaker 765 that causes the speaker to emit an audio signal indicating a weak hit result (step 1805). A weak hit imparts little damage to the opposing toy figure. Damage from the hit is measured in hit points associated with each toy figure. After indicating the hit results, the controller 750 removes the total number of attack points from the hit points associated with the opposing toy figure (step 1810).

If the controller determines that the attack point total falls within a middle range of predetermined values (step 1815), the controller 750 sends a signal to the speaker 765 that causes the speaker to emit an audio signal indicating a medium hit result (step 1820). After indicating the medium hit result, the controller 750 removes the total number of attack points from the hit points associated with the opposing toy figure (step 1810).

If the controller determines that the attack point total exceeds a high predetermined value (step 1825), the controller 750 sends a signal to the speaker 765 that causes the speaker to emit an audio signal indicating a strong hit result (step 1830). After indicating the strong hit result, the controller 750 removes the total number of attack points from the hit points associated with the opposing toy figure, thus imparting damage to the opposing toy figure (step 1810).

Referring again to FIG. 10, after the controller 750 indicates the attack results, the controller 750 determines whether either of the players has won the game (step 1035). A player wins the game if the opposing player's toy figure has no hit points—that is, the opposing player's toy figure has received an excessive amount of damage. If neither player has won the game (step 1035), the controller 750 indicates the status of the toy figure associated with the opposing player (step 1040) by sending a signal to the speaker that causes the speaker 765 to emit an audio signal indicating the remaining hit points associated with the opposing player. If a player has won the game (step 1035), the controller 750 indicates the winner of the game (step 1045) by causing the light emitters near the winning toy figure to flash, causing the speaker to emit an audio signal of a cheering crowd, causing the speaker to emit an audio signal of the toy figure chanting its own name, or causing any or all of these events to occur.

Once a player has won a game (step 1035), the controller 750 stores information relating to the game result into the memory 110 of the winning and losing toy figures (step 1050). Thus, statistics stored in the memory 110 of the toy figures that have been recently engaged in the battle would be updated to include results of this most recent game.

Figure 19:
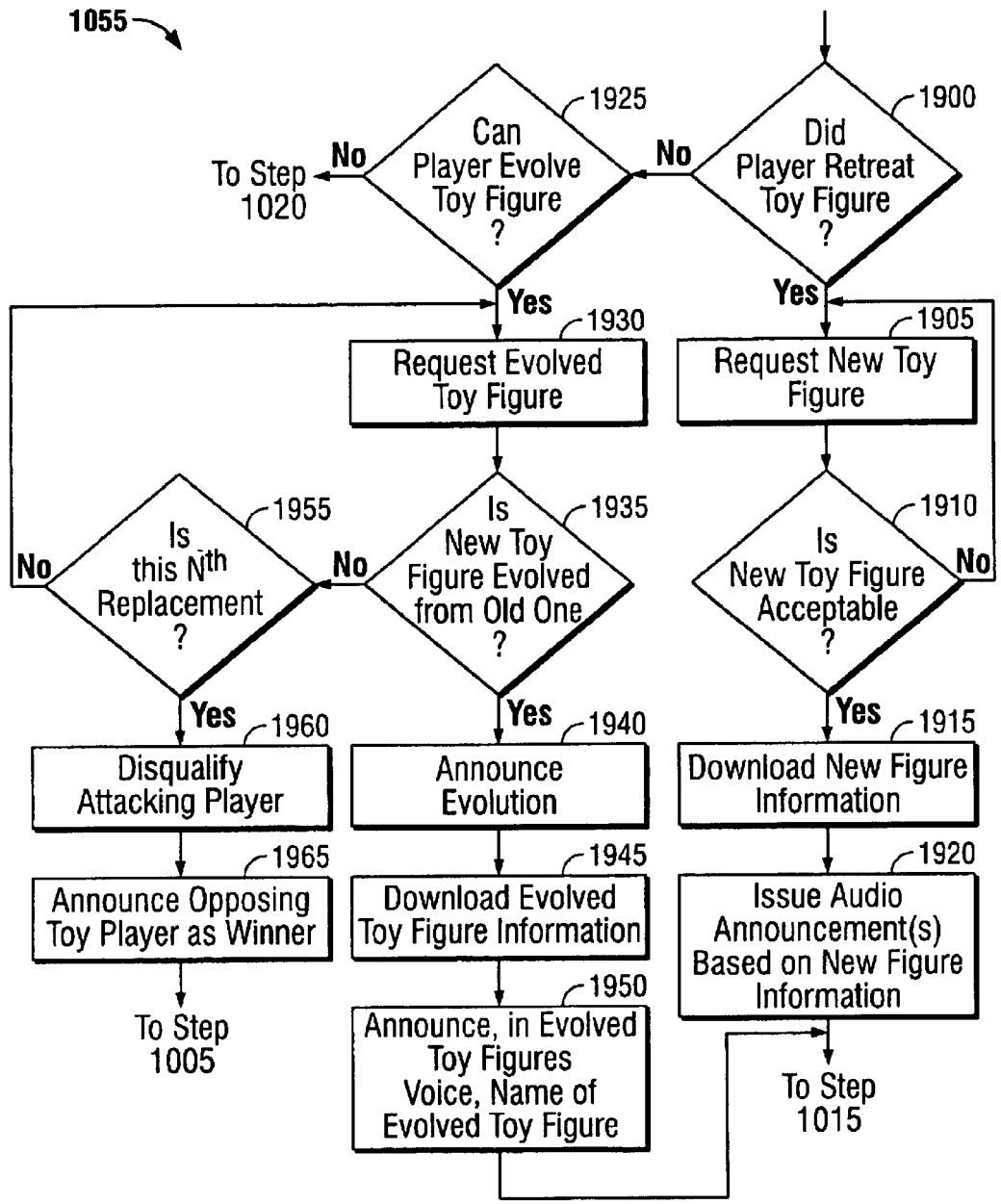

If the controller 750 determines that the player has not issued an attack signal (step 1020), then the controller 750 determines whether the player can issue any other action (step 1055). The controller 750 performs this determination according to a procedure 1055 that is shown in FIG. 19. Initially, the controller 750 determines whether the player is retreating the toy figure from the game arena 200 (step 1900). The player retreats the toy figure from the game arena 200 by disconnecting the toy figure's connector 115 with the game arena connector 205. If the player has retreated the toy figure (step 1900), the controller 750 requests that the player mount a new toy figure into the game arena (step 1905). The controller 750 makes this request by issuing a signal to the speaker 765 that causes the speaker to emit an audio signal requesting the new toy figure. The controller 750 determines whether the recently mounted toy figure is acceptable (step 1910). An acceptable toy figure is any toy figure that is different from the recently retreated toy figure. However, if the recently mounted toy figure is an evolved-type toy figure, then it must be evolved from the recently retreated toy figure to be acceptable at this stage of the game.

The controller 750 can identify acceptability by comparing the unique identification of the recently mounted toy figure to the unique identification of the removed toy figure—if the two identifications are identical, then the toy figures are identical and the recently mounted toy figure is unacceptable. Furthermore, if the identification comparison indicates that the recently mounted toy figure is not evolved from the recently retreated toy figure, then the recently mounted toy figure is unacceptable.

If the recently mounted toy figure were not acceptable (step 1910), the controller requests a new toy figure (step 1905). If the recently mounted toy figure were acceptable (step 1910), the controller 750 downloads information relating to that toy figure from the toy figure's memory 110 (step 1915). The controller 750 then sends a signal to the speaker causing the speaker to issue one or more audio announcements based on the new figure information (step 1920). For example, the speaker may issue an audio signal corresponding to the voice of the toy figure announcing its own name. Following such announcements (step 1920), the controller indicates the attacking player by, for example, flashing light emitters near the attacking toy figure (step 1015).

If, on the other hand, the controller 750 determines that the player has not retreated the toy figure from the game arena (step 1900), the controller 750 determines whether the player could evolve the toy figure to another toy figure (step 1925). If not, then the controller determines whether the attacking player is issuing an attack (step 1020).

If the player can evolve the toy figure, then the controller 750 requests an evolved toy figure (step 1930) by, for example, sending a signal to the speaker that causes the speaker to emit an audio signal requesting the evolved toy figure. The controller 750 then determines whether a new toy connected to the game arena 200 has evolved from the previously-connected toy figure (step 1935), and if so, the controller 750 announces such evolution (step 1940) by sending a signal to the speaker that causes the speaker to emit an audio signal announcing the evolution.

The controller determines whether the new toy has evolved from the previously-connected toy figure by comparing the identifications and determining whether the identifications are related by the evolution step. The controller 750 downloads the information relating to the evolved toy figure from the memory 110 within that evolved toy figure (step 1945), and, based on the downloaded information, the controller 750 sends a signal to the speaker causing the speaker to announce, in the evolved toy figure's voice, a name of the evolved toy figure (step 1950). Following such announcement (step 1950), the controller indicates the attacking player by, for example, flashing light emitters near the attacking toy figure (step 1015).

If the controller 750 determines that the new toy is not evolved from the preceding toy figure (step 1935), the controller 750 determines whether this is the Nth such replacement during this game (step 1955), where N is an integer that indicates a maximum number of replacements permitted in the game. If the player has not reached this maximum number of replacements, the controller 750 continues to request an evolved toy figure from the player because the player presumably has yet to replace the preceding toy figure with an evolved toy figure (step 1930). If the player has requested the Nth such replacement during this game, then the controller 750 may be configured to disqualify the attacking player (step 1960) and announce (using the speaker and/or the light emitters) the opposing player as the winner of the game (step 1965). After that, the game is over, and the controller 750 selects the next player to attack first in the next game (step 1005).

Hand-held Electronic Game

Referring again to FIG. 3, the electronic game system may be a hand-held electronic game device 300. Such hand-held electronic game devices 300 are typically include a housing 310 that contains one or more user input buttons that each perform various tasks. Input buttons generally include an on or start button 315 to turn on and/or start a game, a score or status button 320 to see the status of the game, and a control button 325 to control various aspects (such as the position of a character) of the game. A display region 330 such as a liquid crystal display (LCD) screen is positioned at the front of the housing 310 to be clearly visible to the player.

The adapter 302 may include an input mechanism 331 for receiving a portable memory device 332 such as a diskette or CD. The game device 300 accesses information stored in the memory device 332. The information relates to game play strategy and/or rules, and may be used to facilitate game play between the toy figure 100 and the game device 300.

Figure 20:
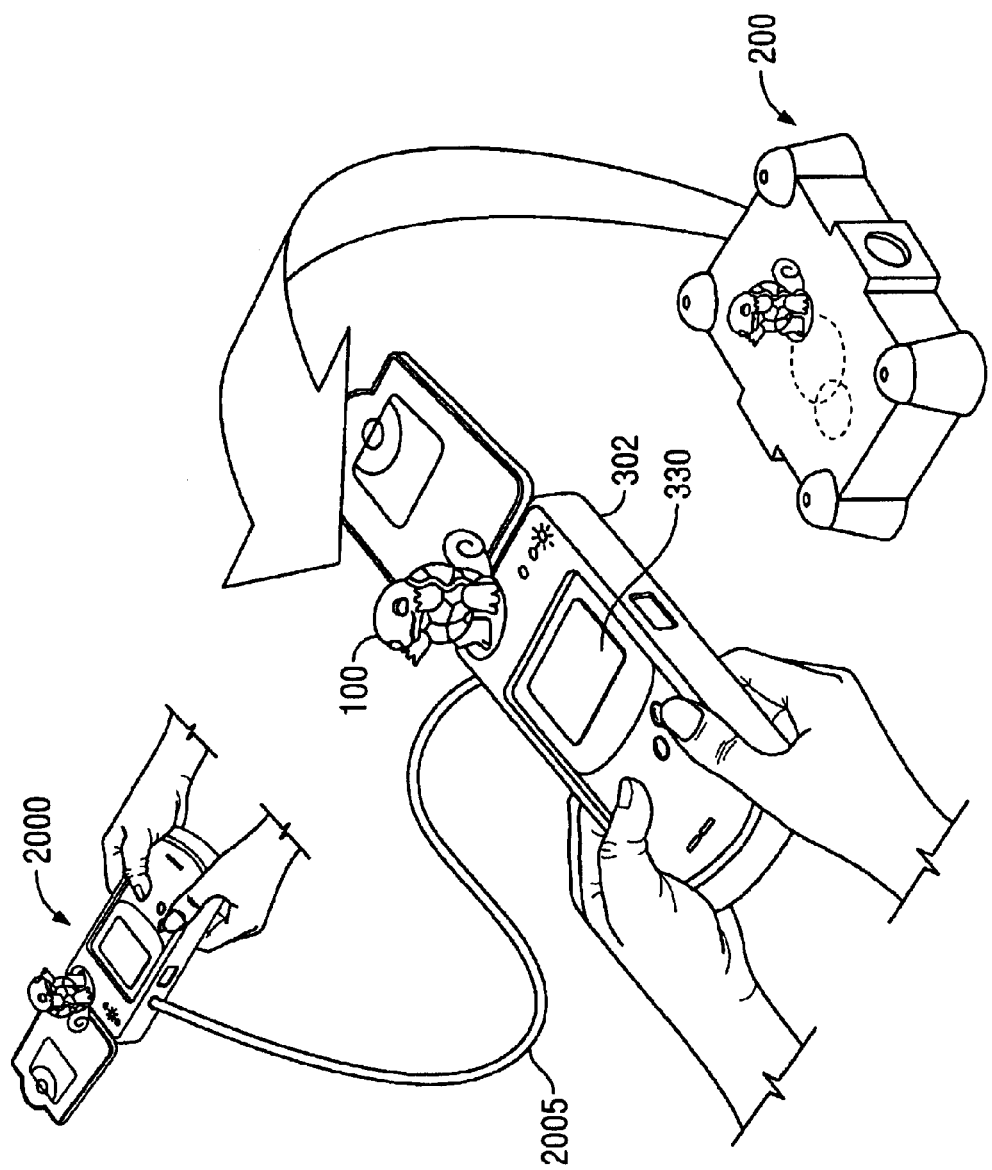
FIG. 20 is a perspective view of the game system of FIG. 3.

The adapter 302 may include an additional connector 335 to enable the game device 300 to connect to another game device 2000 through a cable 2005 as shown in FIG. 20. In this way, the player of the game device 300 may play another player controlling game device 2000. The adapter 302 is designed so that the game device 300 may slide into the adapter 302 through a slot 333, thus protecting the game device 300 during game play.

Figure 21:
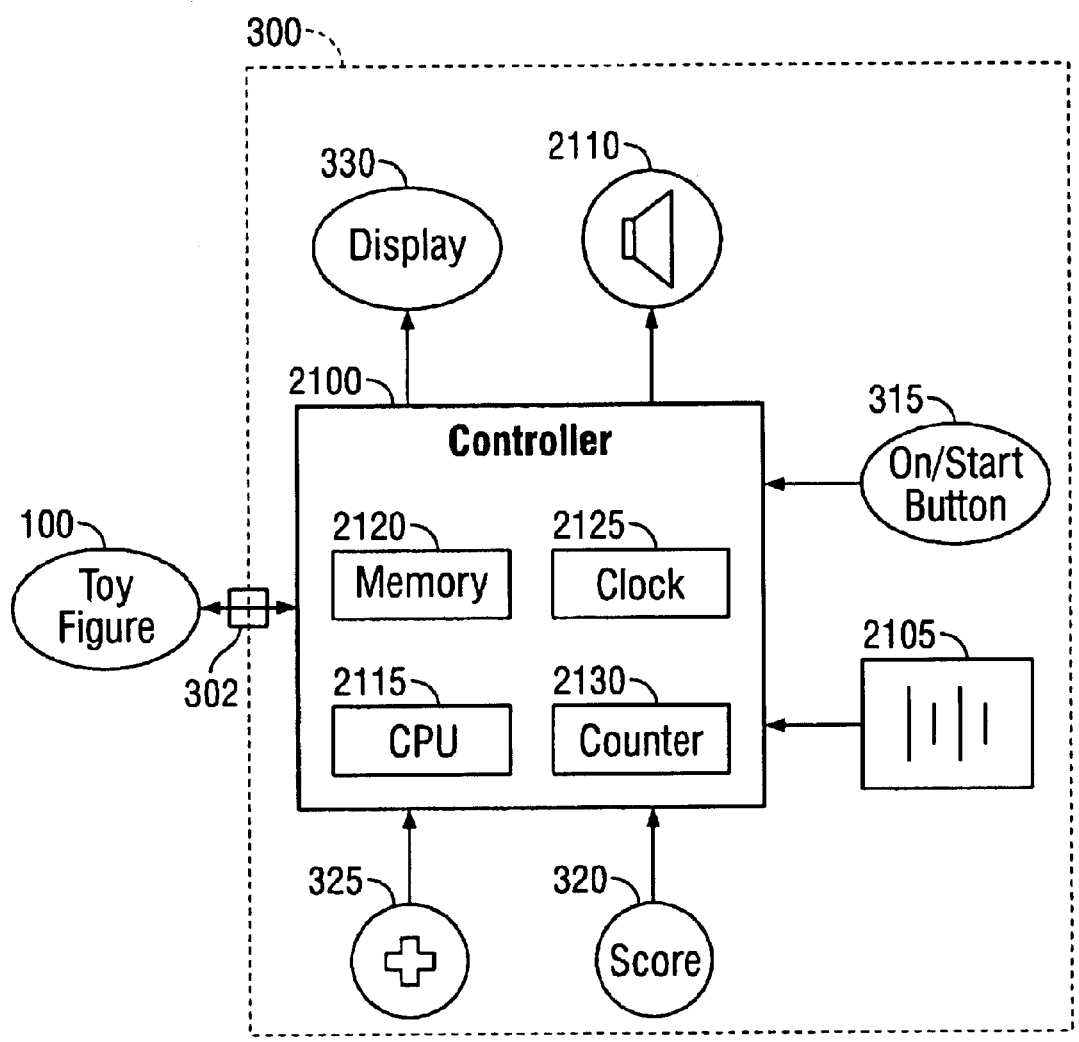
FIG. 21 is a block diagram of the game system of FIG. 3.

Referring also to FIG. 21, the housing 310 contains an electronic controller 2100 that connects to and controls other game components. A power source 2105 (for example, a battery) is contained in the housing 310 and provides electrical power for the controller 2100. As game play requires, the controller 2100 controls the image displayed on the LCD screen 330 and/or sends a signal to a speaker 2110 contained in the housing 310 based on input from the player. The controller 2100 performs these tasks using additional information obtained from a processor 2115, memory 2120, a clock 2125, and a counter 2130.

The toy figure 100 is adapted for play with the hand-held device 300 using the adapter 302 that attaches to the housing 310 and provides the necessary electronic connections for interfacing the toy figure 100 with the hand-held device 300. Thus, the adapter 302 includes the connector 304 that mates with the connector 115 on the toy figure 100. In this way, the player can effectively insert the toy figure 100 into the hand-held device 300, which uses information downloaded through the adapter 302 and through the memory device 332 to interact with the toy figure.

Figure 22:
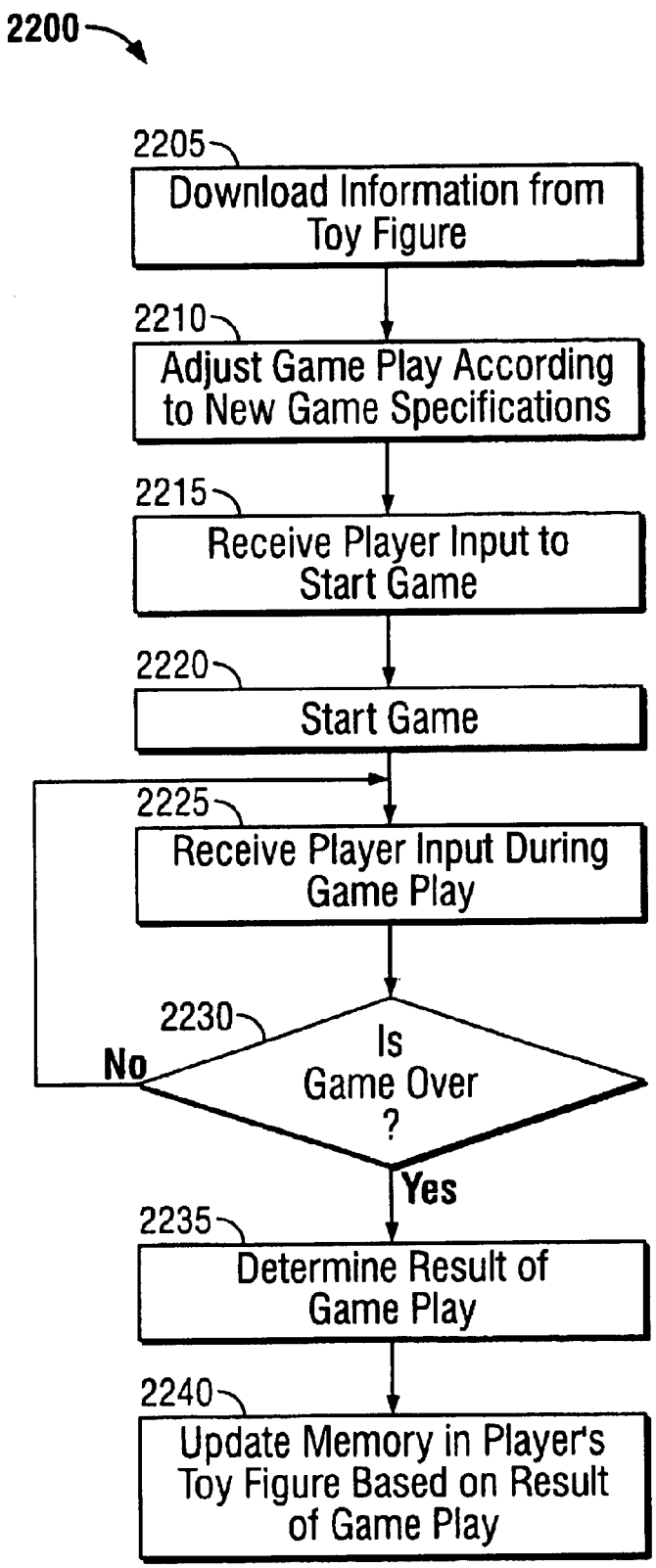
FIG. 22 is a flow chart of a procedure performed by the game system of FIG. 3.

Referring also to FIG. 22, during game play, the controller 2100 performs a procedure 2200 that is initiated when the player turns on the game device 300 using the on button 315 and inserts the toy figure 100 into the adapter 302. The controller 2100 downloads the information from the toy figure 100 and possible from the memory device 332 (step 2205) before beginning a game. The controller 2100 accesses from the toy figure information such as the rules and specifications that govern how the game is played in conjunction with the toy figure, a unique identification of the toy figure, visual and/or audio representations of the toy figure, and attributes of the toy figure. If the memory device 332 is inserted into the input mechanism 331, the controller 2100 may access from the memory device 332 information such as the rules and specifications that govern how the game is played in conjunction with a toy figure.

Based on the downloaded information, the controller 2100 adjusts the play of the game (step 2210). For example, the controller 2100 may display a representation of the toy figure on the LCD screen 330 using the downloaded visual representation of the toy figure. The controller 2100 also may send a signal to the speaker 2110 that causes the speaker to emit an audio signal that corresponds to the downloaded audio representation of the toy figure. Using the downloaded rules and specifications, the controller 2100 displays on the LCD screen 330 a game area that corresponds to the game area in which a game using the toy figure is played. Using the downloaded rules and specifications, the controller 2100 alters the execution of the game to more fully integrate the representations of the toy figure. Using the downloaded rules and specifications, the controller 2100 may change the effect that the inputs 315, 320, 325 have on game play. For example, if the input 325 is traditionally used to position a character at a particular location in the game area, then the input 325 alternatively may be used to adjust a power of attack or a moment of attack.

After the controller 2100 adjusts game play based on the downloaded information, the controller 2100 receives input from the player through one of the inputs 315, 320, 325 indicating the start of the game (step 2215). The controller 2100 then begins the game (step 2220) and receives player input through one or more of the inputs 315, 320, 325 during game play (step 2225). When the controller determines that the game is over (step 2230), the controller determines the result of the game (step 2235) and then stores information relating to the game result in the memory 110 of the toy figure (step 2240). Thus, statistics stored in the memory 110 (such as, for example, number of wins, number of losses, and number of survived attacks) are updated to include the results of the most recent game Toy Figure Reader and Trainer Referring again to FIG. 4, the electronic game system may be a hand-held electronic reading/training device 400. The hand-held electronic reading/training device 400 includes a housing 410 made of two adjoining sections 415, 420 that are connected along a central hinge 422. When not in use, the section 420 may be folded onto section 415 to protect the components of the device 400. Moreover, the device 400 may be automatically turned off when section 420 is folded onto section 415 and automatically turned on when section 420 is separated from section 415. A display region 425, such as an LCD screen, is positioned at the front of the housing 410 and clearly visible to the player.

The hand-held reading/training device 400 contains one or more user input buttons that each perform various tasks. Input buttons include a mode button 430, a minus button 435 that serves a dual purpose depending on the selected mode, an equal button 440 that serves a dual purpose depending on the selected mode, and a plus button 445 that serves a dual purpose depending on the selected mode.

Figures 23, 25:
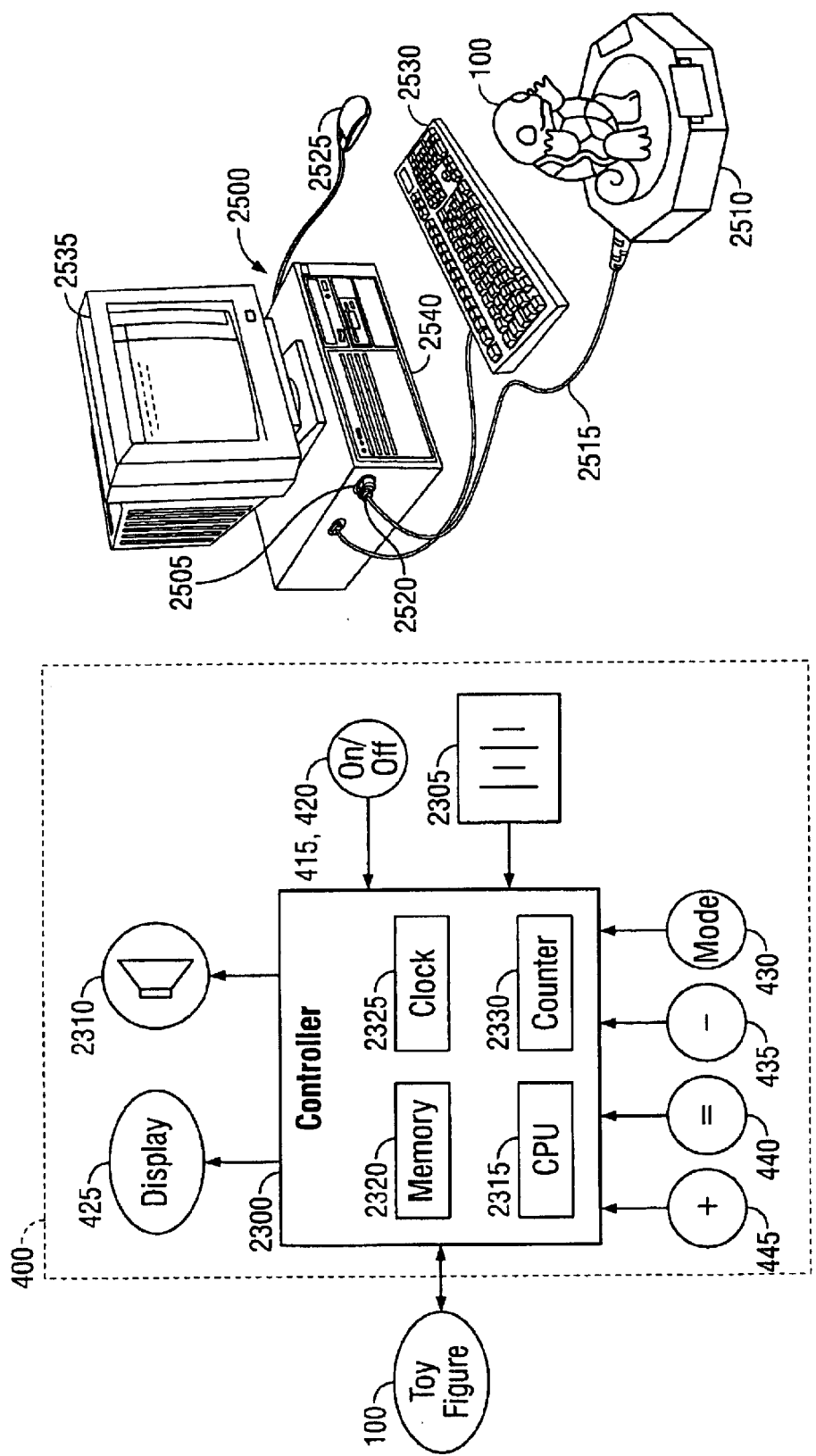
FIG. 23 is a block diagram of the game system of FIG. 4.
FIG. 25 is a perspective view of a home computer game system.

Referring also to FIG. 23, the housing 410 contains an electronic controller 2300 that connects to and controls other game components. A power source 2305 (for example, a battery) is contained by the housing 410 and provides electrical power for the controller 2300. As reading or training requires, the controller 2300 controls the image displayed on the LCD screen 425 and/or sends a signal to a speaker 2310 contained in the housing 410 based on input from the player. The controller 2300 performs these tasks using additional information obtained from a processor 2315, memory 2320, a clock 2325, and a counter 2330.

The toy figure 100 is attached to the housing 410 at the connector 405. In this way, the controller 2300 is able to download information from the memory 110 through the connector 405 to interact with the toy figure 100.

Figure 24:
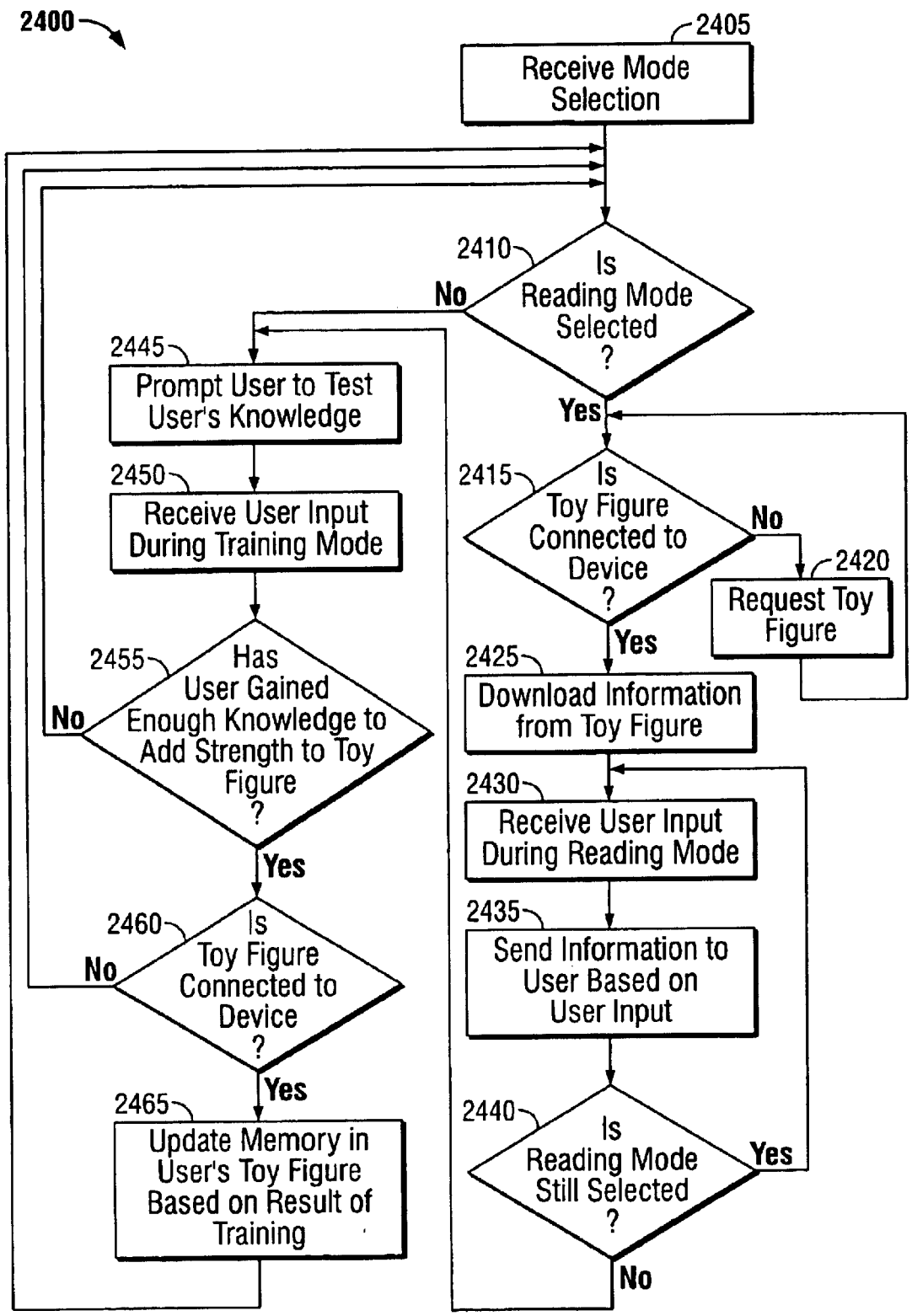
FIG. 24 is a flow chart of a procedure performed by the game system of FIG. 4.

Referring also to FIG. 24, during operation of the reading/training device 400, the controller 2300 performs a procedure 2400 that is initiated when the player turns on the reading/training device 400 by, for example, opening the adjoining sections 415, 420. Because the reading/training device 400 operates in one of two modes, reading or training, the controller 2300 receives the user's selection of the mode (step 2405). The user would select the mode by pressing the mode button 430.

During the reading mode, the user can access information relating to a toy figure connected to the connector 405 using the reading/training device 400. Such information includes identification information such as the name of the toy figure 100, the power type of that toy figure 100 (for example, whether the toy figure exhibits a fire, water, grass, ice, fighting, poison, ground, flying, psychic, bug, rock, ghost, or dragon power), and the unique identification associated with that toy figure. Information also includes the total amount of damage that the toy figure could withstand (referred to as the hit point total), the number of battles that the toy figure has participated in (referred to as the match point total), and the number of battles that the toy figure has won (referred to as the win total). The reading/training device 400 may also play an audio signal that represents the toy figure's audio representation. That audio signal may speak the toy figure's name and the toy figure's general type of attack.

The controller 2300 determines whether the reading mode is selected (step 2410), and if so, the controller 2300 determines whether the toy figure is attached to the connector 405 (step 2415) because the controller 2300 needs to access information stored within the toy figure's memory 110. If the toy figure were not attached to the connector 405 (step 2415), the controller 2300 asks the user to insert the toy figure into the connector 405 (step 2420).

When the controller 2300 determines that the toy figure is attached to the connector 405 (step 2415), the controller 2300 downloads the information from the toy figure 100 (step 2425). Information downloaded includes the rules and specifications that govern how the toy figure plays a game, a unique identification of the toy figure, visual and/or audio representations of the toy figure, and attributes of the toy figure.

The controller 2300 receives input from the user during the reading mode (step 2430) whenever the user presses one of the input buttons on the housing 410. When the user presses the minus button 435 during reading mode, this indicates that the user wishes to know the toy figure's identification information. When the user presses the equal button 440 during reading mode, this indicates that the user wishes to know statistics relating to battles for that toy figure. When the user presses the plus button 445 during reading mode, this indicates that the user wishes to hear the audio representations of the toy figure.

Based on the downloaded information and the user input, the controller 2300 outputs information to the user (step 2435). For example, the controller 2300 may display the downloaded visual representation of the toy figure on the LCD screen 425 when the user selects the minus button 435. The controller 2300 may send a signal to the speaker 2310 that causes the speaker to emit an audio signal that corresponds to the toy figure's voice or downloaded audio representation when the user selects the minus button 435. The controller 2300 may display the number of wins, number of losses, and/or number of completed battles on the LCD screen 425 when the user selects the equal button 440. Likewise, the controller 2300 may send a signal to the speaker that causes the speaker to emit an audio signal indicating the number or wins, losses, and/or engaged battles when the user selects the equal button 440. The controller 2300 may send a signal to the speaker that causes the speaker to emit an audio signal of the audio representation of the toy figure when the user selects the plus button 445.

After the controller 2300 outputs information to the user based on the downloaded information and the user input, the controller 2300 determines whether reading mode is still selected (step 2440). If so, the controller 2300 continues to receive user input during the reading mode (step 2430).

If the user has pressed the mode button 430, then the controller 2300 operates in the training mode. During training mode, the controller 2300 trains and tests the user's knowledge of the types of toy figures. For example, the controller 2300 may test the user's knowledge of the power associated with a particular toy figure. The controller 2300 may test the user's knowledge of which toy figures have advantages or disadvantages relative to other toy figures. Because no particular toy figure is required for the controller 2300 to operate in the training mode, there is no need for the user to insert a toy figure into the connector 405 at this point.

The controller 2300 prompts the user for input to test the user's knowledge about particular aspects of the toy figures or games that the toy figures would engage in (step 2445). For example, the controller 2300 may send a signal to the speaker that causes the speaker 2310 to emit an audio signal of a question that would prompt the user to answer using one or more of the input buttons 435, 440, 445. An example of a typical question may be "is the toy figure 1 strong against an attack from toy figure 2?" The controller 2300 may cause the display 425 to show a visual representation of a first toy figure and then a second toy figure and request that the user indicate if the first toy figure is strong against an attack from the second toy figure.

The controller 2300 receives input from the user during the training mode whenever the user presses one of the input buttons on the housing 410 in response to the prompt (step 2450). When the user presses the minus button 435 during training mode, this indicates that the user has selected the option that the toy figure in question is weak against a certain opposing toy figure. When the user presses the equal button 440 during training mode, this indicates that the user has selected the option that the toy figure in question is equal against a certain opposing toy figure. When the user presses the plus button 445 during training mode, this indicates that the user has selected the option that the toy figure in question is strong against a certain opposing toy figure.

After the user has been interacting with the controller 2300 in training mode, eventually the user will acquire enough knowledge to add hit points to the strength of each of their toy figures. Therefore, the controller 2300 determines whether the user has acquired enough knowledge to add strength to a toy figure (step 2455) and if not, the controller 2300 would then proceed to determine whether reading mode has been selected (step 2410). If the user has acquired enough knowledge to add strength to a toy figure (step 2455), then the controller 2300 determines if a toy figure is attached to the connector 405 (step 2460). If there is no toy figure attached to the connector 405 (step 2460), the controller may proceed to determine whether reading mode has now been selected (step 2410). On the other hand, the controller may proceed to request that the user attach a toy figure to the connector 405 at this point in time. In any case, once the toy figure 100 is attached to the connector 405, the controller can update the hit points saved in the memory 110 of the attached toy figure 100 (step 2465).

Home Computer System

Referring also to FIG. 25, the toy figure 100 may be adapted to mate with a home computer system 2500 to permit interaction between the toy figure 100 and the home computer system 2500. Interaction between the home computer system 2500 and the toy figure 100 may be achieved through an electrical connection between connector 115 on the toy figure 100 and a corresponding parallel port 2505 of the home computer system. The electrical connection employs a toy figure base 2510 onto which the toy figure connects and a cable assembly 2515 that includes a plug 2520 that couples to the parallel port 2505.

Figure 26:
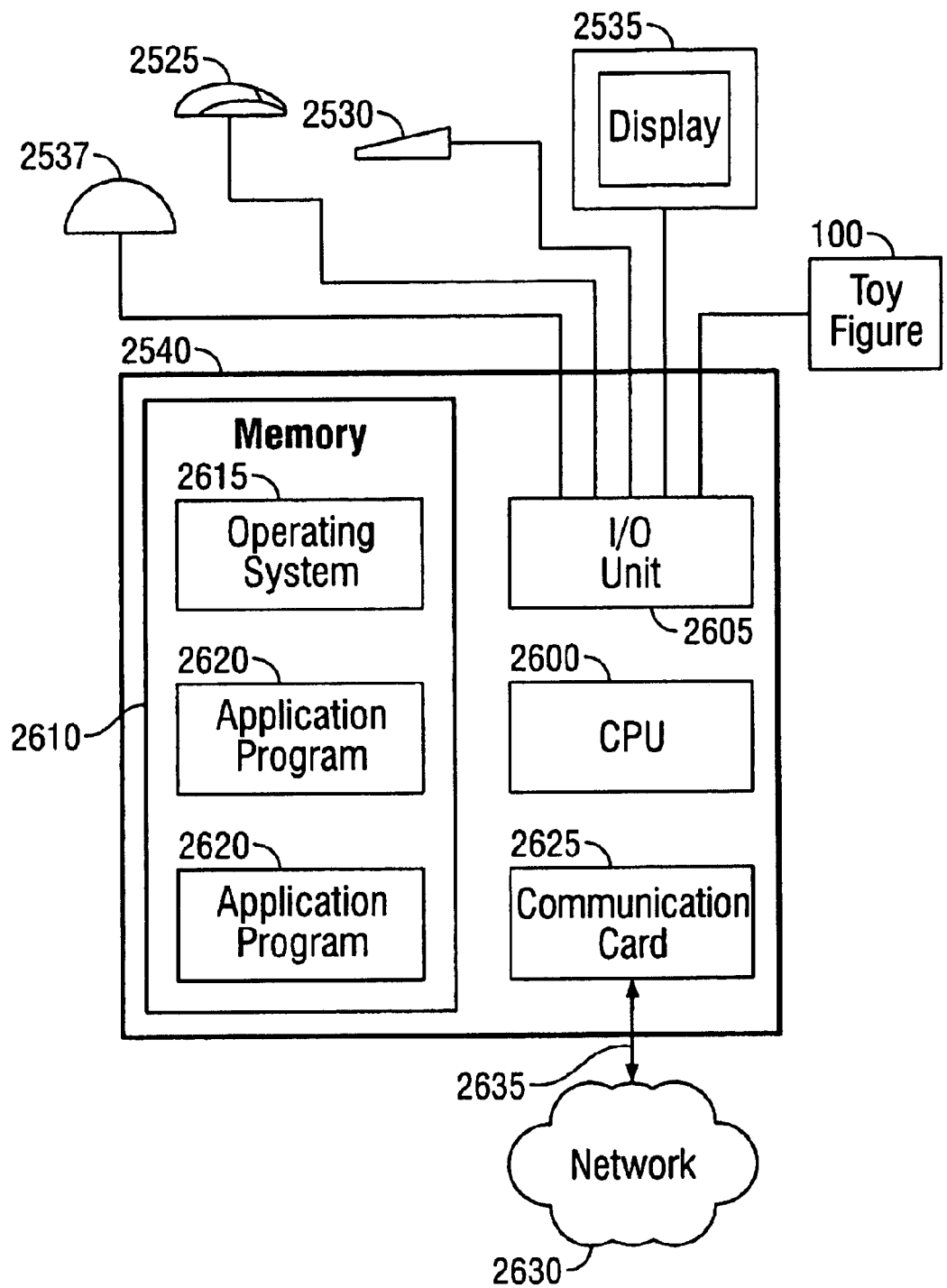
FIG. 26 is a block diagram of the home computer game system of FIG. 25.
Figure 27A:
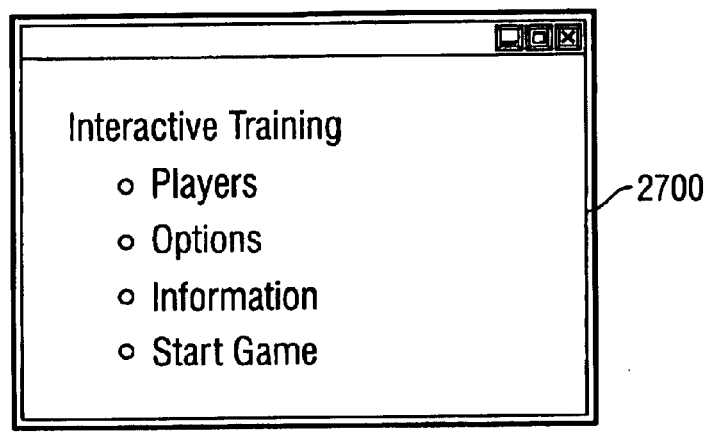
FIGS. 27A–27D are screen shots displayed during game play using the home computer game system of FIG. 25.
Figure 27B:
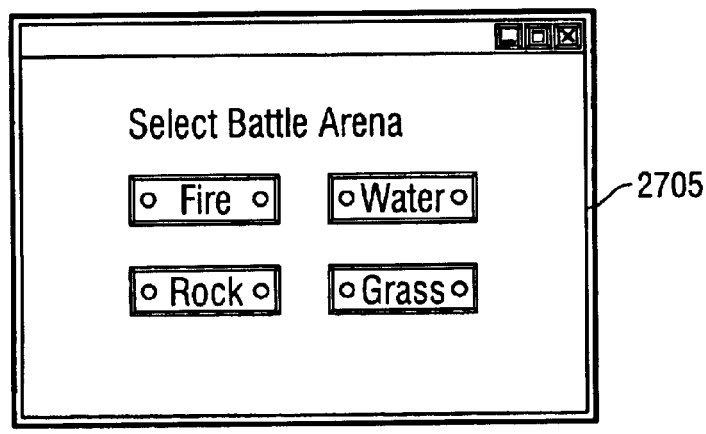
Figure 27C:
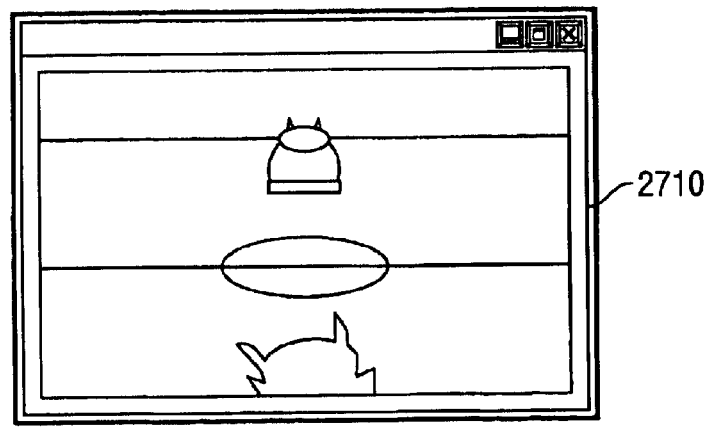
Figure 27D:
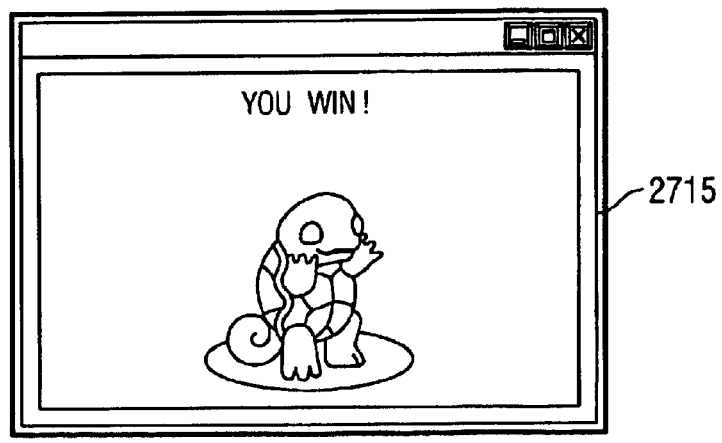

Referring also to FIG. 26, the home computer system 2500 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, virtual worlds, and links to other objects. The system 2500 includes various input/output (I/O) devices (for example, a mouse 2525, a keyboard 2530, a display 2535, and a game controller 2537) and a general purpose computer 2540 having a central processor unit (CPU) 2600, an I/O unit 2605 and a memory 2610. Memory 2610 stores data and various programs such as an operating system 2615, and one or more application programs 2620 (for example, a video game). The computer system 2500 also typically includes some sort of communications card or device 2625 (for example, a modem or network adapter) for exchanging data with a network 2630 via a communications link 2635 (for example, a telephone or cable line).

The computer system memory 2610 may include a network browser that enables the user to access and view electronic content stored either locally or remotely, such as in a network environment (local area network, intranet, Internet). When the user instructs the browser to access a document, or webpage, the browser contacts a corresponding server hosting the requested webpage, retrieves the one or more files that make up the webpage, and displays the webpage in a window on the user's computer system 2500.

The monitor or display 2535 may display a character corresponding to the user's toy figure 100 connected to the computer system 2500 along with other characters corresponding to toy figures opposing the user's toy figure 100. Additionally, the home computer system 2500 may play audio signals relating to game play when the user's toy figure 100 is connected to the computer system 2500. The toy figure base 2510 may cause the toy figure 100 to spin or wobble from side to side when interacting with the computer system 2500.

When the toy figure 100 is connected to the computer system 2500, the toy figure's character may be used in games accessed through a network browser or through software stored locally at the user's computer system 2500. Thus, the user may play the toy figure's character against other toy figure characters (either at the home computer system 2500 or across the network at a remote location) or against characters controlled by gaming software. In any case, the home computer system 2500 downloads information stored in the toy figure's memory in the integrated circuit 110 through port 2505 and adjusts game play accordingly. When a game is completed, the home computer system 2500 may upload statistics relating to results of the game into the memory in the integrated circuit 110 of the attached toy figure 100 through port 2505.

During game play, the user controls the toy figure's character using an input device such as, for example, the keyboard 2530, the mouse 2525, or the game controller 2537. When the user operates the input device, the computer 2540 controls actions of the character and outcomes of activities in which the toy figure is engaged. For example, if the user operates an input device, thus causing the toy figure's character to attack an opposing toy figure's character, the comptuer 2540 determines how much damage is imparted to the opposing toy figure's character and adjusts the game accordingly, as described above with respect to the other game devices.

As mentioned above, the user may engage in a battle over a network with a remote user. In that case, the web site hosting the battle would download information from the home computer system 2500 and adjust play accordingly. Likewise, the web site hosting the battle would upload information to the home computer system 2500 at the end of each game, or whenever the user commands. In this way, characteristics of the toy figure are updated after interaction with the home computer system 2500.

Examples of possible game programs include a trainer/quiz game and a game arena that may include a virtual battle stadium. Referring to FIGS. 27A–27D, examples of screen shots include an opening option screen 2700 that provides the user with general game related options, a battle arena option screen 2705 that provides the user with options relating to the visual and audio representation of the battle arena, a battle arena screen 2710 that provides the user with a view of the selected battle arena, and a results screen 2715 that provides the user with results of the games.

Network battle using the home computer system 2500 enables the user to do battle with users from other locations. Additionally, a web site that hosts the battles (or a web site related to the battles) may save information relating to toy figures from all over the world. Thus, if the user registers a toy figure, the user may compare statistics of the registered toy figure to other toy figures to determine which toy figures to battle.

Action Figure

Figure 28A:
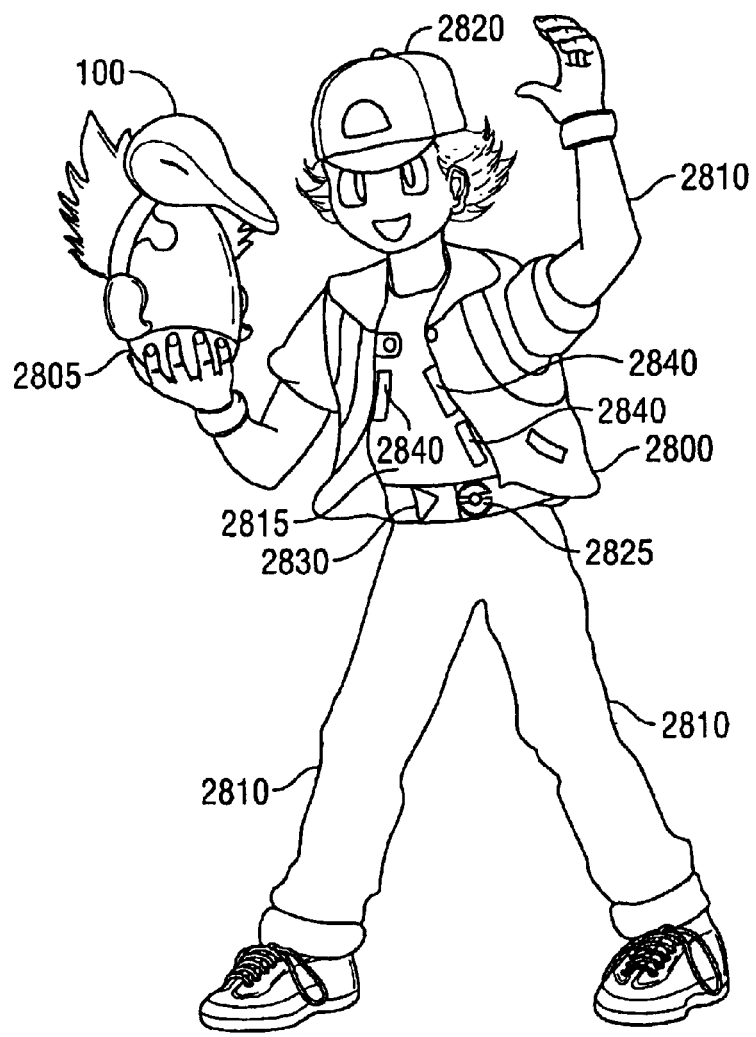
FIGS. 28A–28C are perspective views of a game system with which the toy figure of FIG. 1 can be used.

Referring also to FIG. 28A, the electronic game system may be an action figure device 2800. The action figure device 2800 includes a connector 2805 to which the toy figure 100 may be attached so that information may be exchanged between the toy figure 100 and the action figure device 2800. The action figure device 2800 uses information downloaded from the toy figure 100 to interact with the toy figure 100.

The action figure device 2800 is shaped like an action figure in that appendages 2810 may be movable relative to a torso 2815 of the action figure device 2800. The action figure device 2800 includes a mode selector 2820 to select a mode of play, a YES button 2825 to enable a player to input a positive response, and a NO button 2830 to enable a player to input a negative response. The connector 2805 is defined in a hand of the action figure device 2800.

Figure 28B:
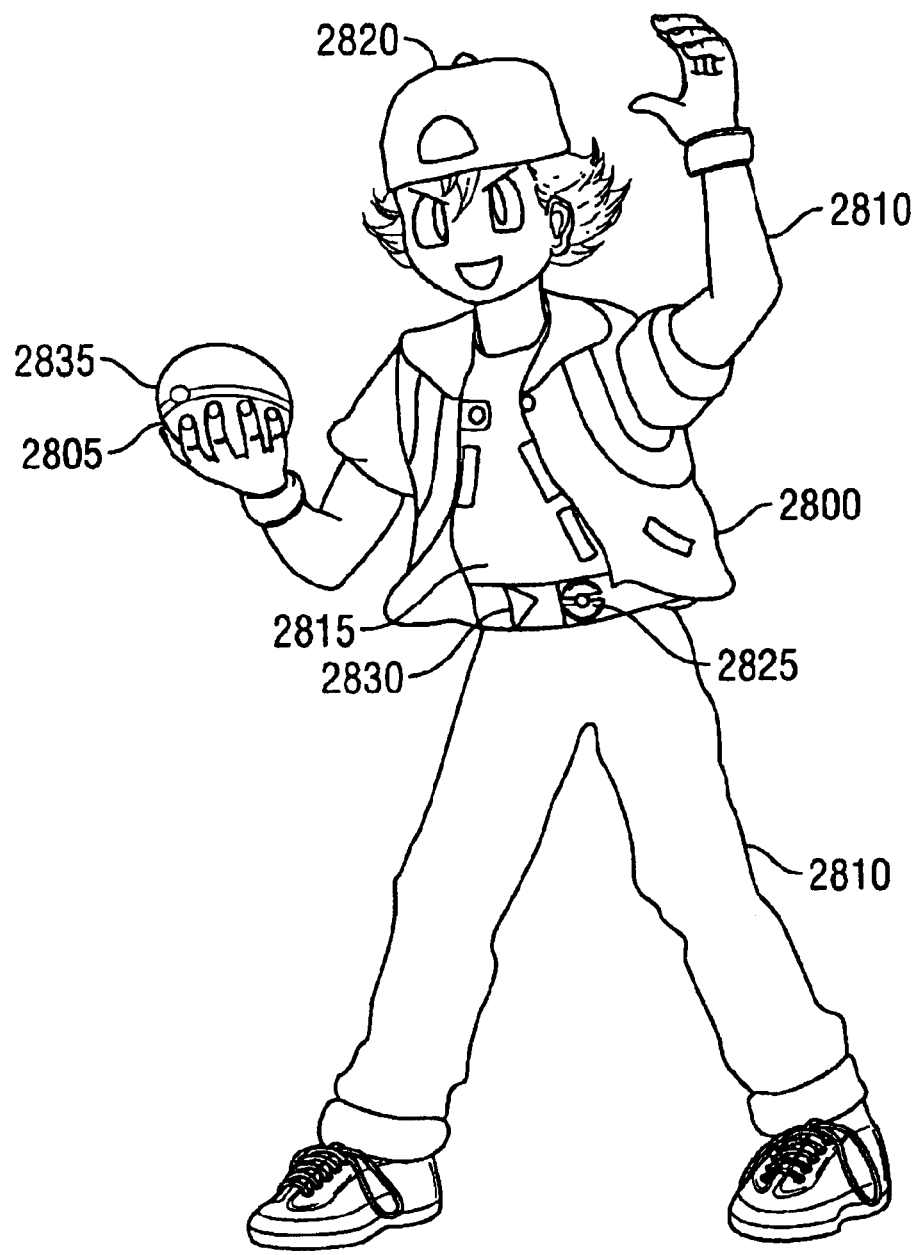

Referring also to FIG. 28B, when a toy figure 100 is not attached to the connector 2805, the connector 2805 may be covered with a neutral FIG. 2835. As shown, the neutral figure 2835 may be in the form of a ball so that the hand of the action figure device 2800 appears to be holding the ball.

Figure 28C:
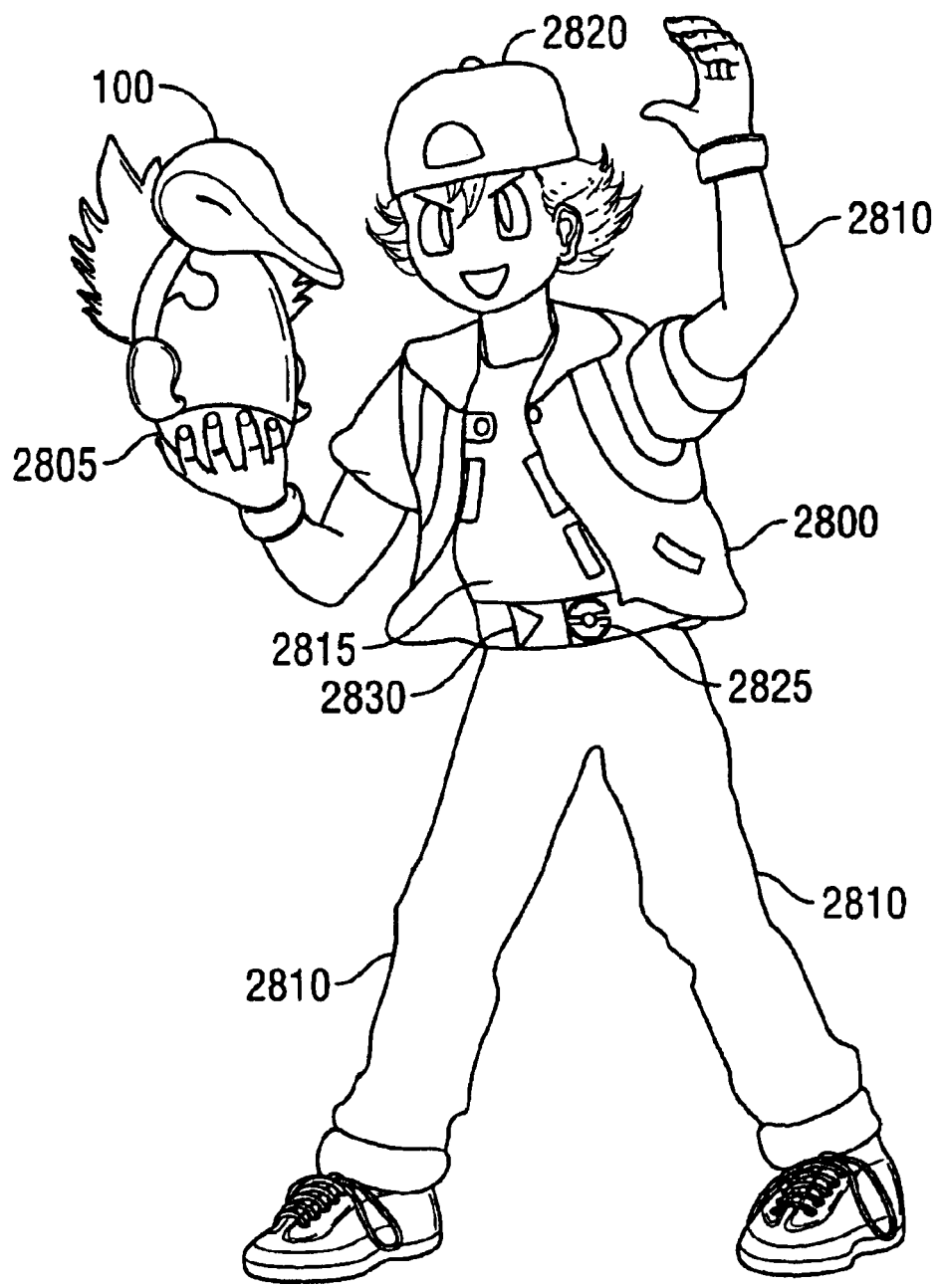

Referring also to FIG. 28C, the mode selector 2820 may be in the form of a rotatable hat. In this way, to enable mode selection, the hat may be rotated from a front position (FIG. 28A) in which the mode of play is a basic mode of play to a back position (FIG. 28C) in which the mode of play is a battle mode of play. The mode of play is discussed in detail below.

Figure 29:
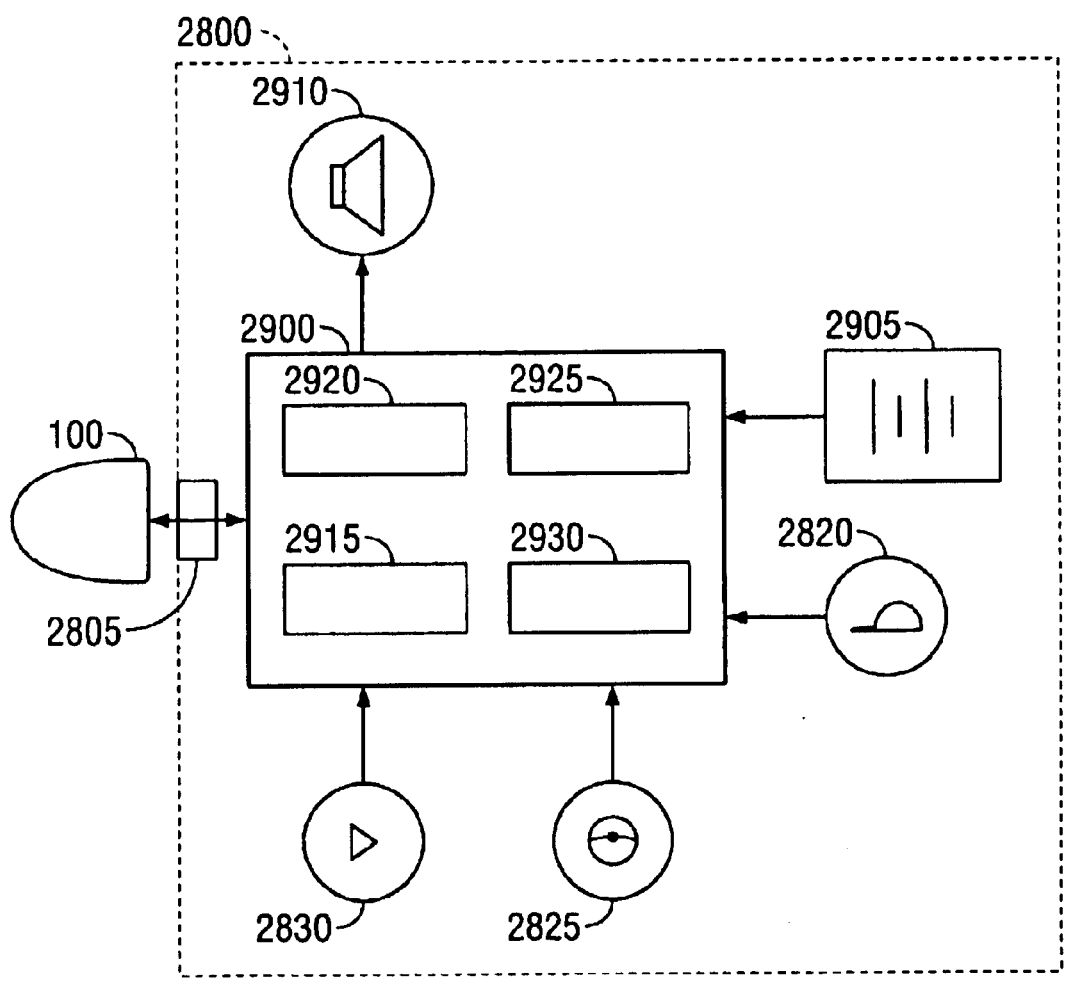
FIG. 29 is a block diagram of the game system of FIGS. 28A–28C.

Referring also to FIG. 29, the action figure device 2800 contains an electronic controller 2900 that connects to and controls other game components. The electronic controller 2900 may be positioned within the torso 2815. A power source 2905 (for example, a battery) may be contained in the action figure device 2800 to provide electrical power for the controller 2900. As game play requires, the controller 2900 sends a signal to a speaker 2910 contained in the device 2800 based on input from the player and the toy figure 100. The speaker 2910 may be contained in the torso 2815 and the torso 2815 may include one or more slots 2840 for permitting the sound to emanate from the speaker 2910 out of the torso 2815. The controller 2900 performs tasks using additional information obtained from a processor 2915, memory 2920, a clock 2925, and a counter 2930.

Figure 30:
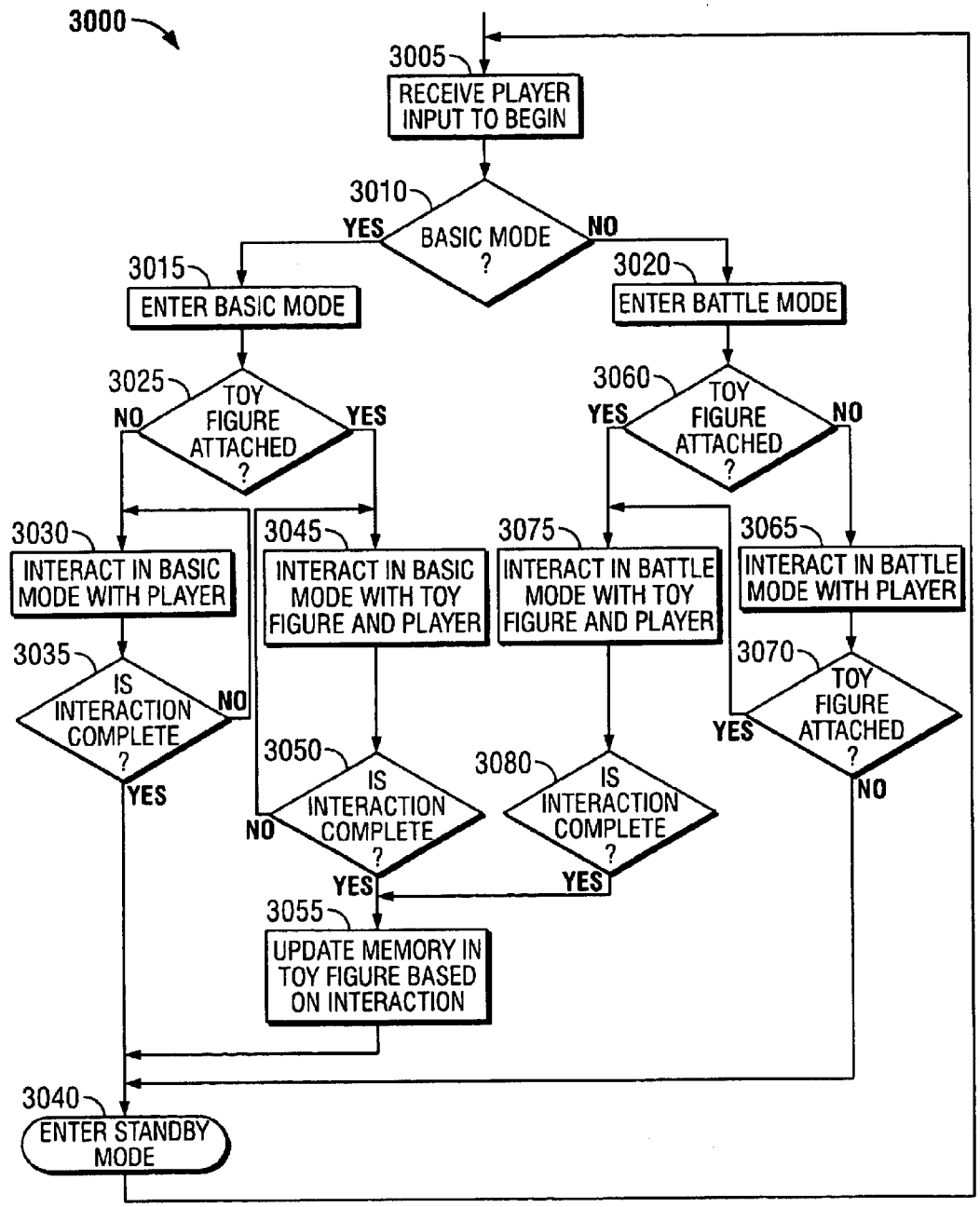
FIGS. 30 and 31 are flow charts of procedures performed by the game system of FIGS. 28A–28C.

Referring also to FIG. 30, during operation of the action figure device 2800, the controller 2900 performs a procedure 3000 that is initiated upon receipt of player input (step 3005). For example, the player may press the YES button 2825 or the NO button 2830 to indicate that play should begin. The controller 2900 determines whether the device 2800 is operating in basic mode (step 3010). If the device 2800 is operating in basic mode, then the controller 2900 enters basic mode play (step 3015). Otherwise, the device 2800 is operating in battle mode and the controller 2900 enters battle mode play (step 3020).

In basic mode, the controller 2900 determines whether a toy figure 100 is attached to the device 2800 (step 3025). If a toy figure 100 is not attached to the device 2800, then the controller 2900 interacts with the player according to basic mode play (step 3030). Upon completion of the interaction (step 3035), the controller 2900 enters standby mode (step 3040) in which the controller 2900 awaits further input. The controller 2900 determines that interaction is complete (step 3035) if the controller 2900 has not received any input from the player after a predetermined period of time.

If the controller 2900 determines that the toy figure 100 is attached to the device 2800 (step 3025), then the controller 2900 interacts with the player and the toy figure 100 according to basic mode play (step 3045). Upon completion of the interaction (step 3050), the controller 2900 stores information relating to the results of basic mode play in the memory 110 of the toy figure (step 3055). Thus, statistics stored in the memory 110 are updated to include the results from the most recent basic mode play. The controller 2900 then enters standby mode (step 3040).

If the controller 2900 enters battle mode play (step 3020), then the controller 2900 determines if a toy figure 100 is attached to the device 2800 (step 3060). If a toy figure 100 is not attached to the device 2800, then the controller 2900 interacts with the player according to battle mode play (step 3065). Upon completion of the interaction, the controller 2900 determines again if the toy figure 100 is attached (step 3070). If the toy figure 100 is not attached (step 3070), then the controller 2900 enters standby mode (step 3040).

If the toy figure 100 is attached (step 3070 or step 3060), then the controller 2900 interacts with the toy figure 100 and the player according to battle mode play (step 3075). Upon completion of the interaction (step 3080), the controller 2900 stores information relating to the results of battle mode play in the memory 110 of the toy figure (step 3055) and then enters standby mode (step 3040).

When the controller 2900 interacts with the player according to basic mode play (step 3030), the controller 2900 may send signals to the speaker 2910 to output predetermined phrases that encourage play with the toy figure 100. The player may respond during this basic mode play by pressing the YES button 2825 or the NO button 2830, thus causing the controller 2900 to send another signal to the speaker 2910 to cycle through the predetermined phrases.

When the controller 2900 interacts with the player and the toy figure 100 according to basic mode play (step 3045), the controller 2900 downloads information within the toy figure 100 and may send signals to the speaker 2910 to output predetermined phrases that encourage interaction among the player, the toy figure 100, and the device 2800. The controller 2900 may receive input from the player whenever the player presses one of the YES or NO buttons 2825, 2830.

The controller 2900 may cause the speaker 2910 to output an audio signal that represents the toy figure's audio representation. That audio signal may speak the toy figure's name and/or the toy figure's general type of attack. After the controller 2900 determines that interaction is complete (step 3050), the controller 2900 updates memory in the toy figure 100 based on the interaction. For example, the controller 2900 may add hit points and/or the strength of the toy figure 100.

When the controller 2900 interacts with the player according to battle mode play (step 3065), the controller 2900 may send signals to the speaker 2910 to output predetermined phrases that encourage the player to attach a toy figure 100 to engage in a battle. The player may respond during the battle mode play by pressing the YES button 2825 or the NO button 2830 or by attaching the toy figure 100. The predetermined phrases may request that the player attach the toy figure 100 the device 2800 to begin a battle.

Figure 31:
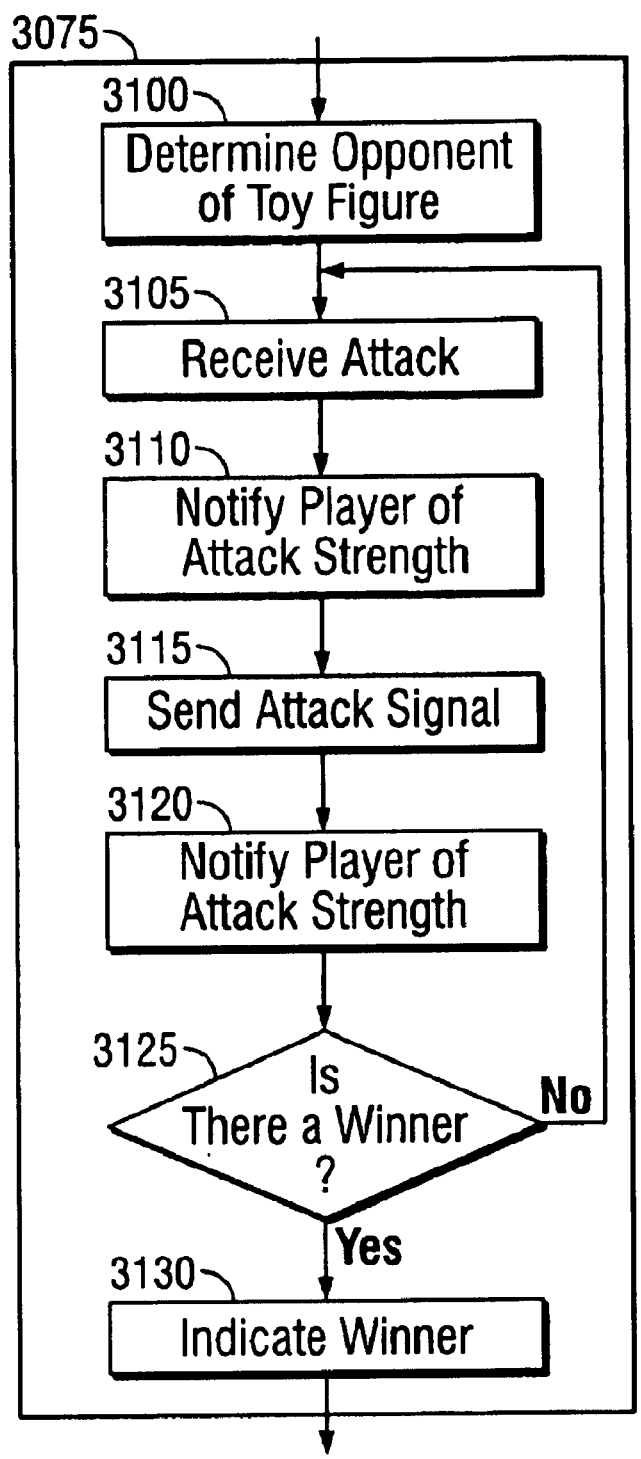

Referring also to FIG. 31, the controller 2900 interacts with the player and the toy figure 100 according to battle mode play by performing a procedure 3075. During this procedure, the controller 2900 engage the player and the toy figure in a battle sequence. Initially, the controller 2900 determines the opponent of the toy figure (step 3100). The controller 2900 may have stored within memory 2920 any number of possible opponents to battle against the toy figure. Thus, the controller 2900 may determine the opponent by causing the speaker to cycle through the possible opponents and request that the player select one of the possible opponents. The player selects by pressing the YES button 2825 or the NO button 2830.

Once the opponent is determined (step 3100), the controller 2900 receives an attack from the toy figure (step 3105) and then notifies the player of the strength of the attack (step 3110). Next, the controller 2900 sends an attack from the opponent (step 3115) and notifies the player of the strength of the attack (step 3120). Details of how an attack proceeds are discussed above with respect to FIGS. 10–16. When the controller 2900 receives or sends an attack, it may also send a signal to the speaker 2910 to output an audio signal indicative of an attack. Additionally, when the controller 2900 notifies the player of the strength of an attack, it sends a signal to the speaker 2910 to output an audio signal indicative of the strength of the attack.

During this sequence, the player may change the toy figure attached to the device 2800. Additionally, at any time during battle, the toy figure or the opponent may change its power mode (discussed above with respect to FIG. 17). In any case, if there is a winner (step 3125), then the controller 2900 indicates the winner (step 3130) by sending a signal to the speaker 2910 to output an audio signal indicative of the winner.

Other implementations are within the scope of the following claims. For example, connection between the toy figure and the electronic game system may be wireless, for example, using an electromagnetic transmission technique such as infrared or radio frequency transmission. In that case, the toy figure need not be directly connected to the game system. This would be particularly beneficial in the game arena 200 in which a player may want to move his/her toy figure over the court area 705. Such a wireless connection would impart a more realistic atmosphere to game play. Data may be transferred to and from the toy figure through, for example, inductive or capacitive coupling.

The toy figure 100 may include a speaker that permits the toy figure 100 to generate sounds when interacting with electronic game systems. The speaker may be coupled to speech generation hardware or software that causes the sounds to be generated as speech.

The toy figure may be in the form of a trading card that would correspond to a three-dimensional character. The controller may replenish or increase a toy figure's hit point total after that toy figure has won a predetermined number of games.

The toy figure may be in the form of a vehicle, such as, for example, an automobile, airplane, locomotive, or spaceship. Electronic game systems may correspond to racing games, such as, for example, a race track or a hand-held device in which the vehicle races. Toy attributes may include engine, suspension, transmission, and/or tire type; modifications; or performance characteristics. Performance characteristics for a vehicle may include horsepower, top speed, cornering traction, modification and repair history, damage, and fuel levels.

The game system may be any video game, computer peripheral, personal computer game. Other game systems include Internet-based games or arcade games. The game system may be a smart game board, which is a traditional game board equipped with a processor and memory for interacting with the players and the toy figures.

Other toy figure attributes include types of weapons, available clues, or available money. Moreover, the consumer may alter attributes for a toy figure before purchasing that toy figure—in this case, the consumer may be charged based on the number, level, and types of attributes selected.

The toy figures may interact with electronic game systems of the same type, but different owners. For example, a toy figure may interact in a game with a first game arena, and then may be used in a second game with a second game arena.

The adapter 302 used in the hand-held electronic game device 300 may be configured as a stand-alone game device such as a toy figure reader/trainer device. For example, the adapter 302 may include all the necessary components (such as, for example, a display and input buttons) to operate as a toy figure reader/trainer device. Thus, the user would need only a single device that adapts to a hand-held game device and a reader/trainer device.

The player operating the other game device 2000 in FIG. 20 may connect any toy figure to the other game device to play against the player operating the game device 300.

The adapter 302 may include a moveable platform on which the connector 304 is formed. Thus, during game play, and whenever the user moves the game device 300, the toy figure 100 will move in response. The moveable platform may include a spring or biasing device that imparts a more random motion to the toy figure 100.

The unique identification for a toy figure may be formed on the body of the toy figure. Likewise, the user, after purchasing the toy figure, may enter a unique code into a game system. The game system may then upload that code into the toy figure when the user connects the toy figure to the game system. In another implementation, a random code may be generated by a game system and then uploaded into the toy figure when the user connects the toy figure to the game system.

What is claimed is:

1. A game comprising:
   a toy figure that includes memory for storing information relating to the toy figure;
   an action figure device configured to communicate with the toy figure, download the stored information relating to the toy figure, receive input from a user, alter the stored information based on the received input and the downloaded information, and provide a representation of the toy figure developed from the stored information when the action figure device communicates with the toy figure; and a game system including:
an input mechanism, and
a controller configured to communicate with the toy figure, download the stored information relating to the toy figure, receive input from a user through the input mechanism independently of communication with the toy figure, alter the stored information based on user input received through the input mechanism and the downloaded information, provide a representation of the toy figure developed from the stored information, and alter the toy figure representation based on the user input received through the input mechanism when the game system controller communicates with the toy figure.

2. The game of claim 1, wherein the toy figure memory comprises re-writeable memory.

3. The game of claim 1, wherein the toy figure memory comprises read only memory.

4. The game of claim 1, wherein the toy figure comprises a connector and the action figure device comprises a mating connector such that the action figure device communicates with the toy figure through a direct connection between the connector on the toy figure and the mating connector on the action figure device.

5. The game of claim 1, wherein information relating to the toy figure comprises statistics of past games in which the toy figure was involved, gaming rules, one or more visual representations of the toy figure, and one or more audio representations of the toy figure.

6. The game of claim 1, wherein information relating to the toy figure comprises a power type that indicates how powerful that toy figure is when interacting with a game system or another toy figure, a weakness type that indicates how weak that toy figure is when interacting with a game system or another toy figure, or a resistance type that indicates how resistant that toy figure is to damage when interacting with a game system or another toy figure.

7. The game of claim 1, wherein the action figure device alters the representation of the toy figure based on the downloaded information relating to the toy figure.

8. The game of claim 1, wherein input received from a user comprises input relating to control of the toy figure during game play.

9. The game of claim 1, wherein the game system comprises a game arena.

10. The game of claim 1, wherein the game system comprises a hand-held electronic device.

11. The game of claim 1, wherein the game system comprises a game board.

12. The game of claim 1, wherein the game system comprises a video game.

13. The game of claim 1, wherein the game system comprises a software game.

14. The game of claim 1, wherein the game system comprises an arcade game.

15. The game of claim 1, wherein the game system comprises a network-based game.

16. The game of claim 1, wherein the game system comprises a computer system game.

17. The game of claim 1, wherein the game system comprises a race track, and the toy figure comprises a vehicle associated with the race track.

18. The game of claim 1, wherein received user input comprises an indication of an action that the representation of the toy figure takes during a game.

19. The game of claim 1, the action figure device is configured to perform game tasks based on the received user input and the downloaded information.

20. The game of claim 1, wherein the action figure device comprises a processor and a speaker that emits, under control of the processor, an audio representation of a toy figure coupled to the game system, the audio representation being downloaded from the toy figure.

21. The game of claim 1, wherein the action figure device comprises a processor, memory, a clock, and a counter, the processor causing the game system to perform various tasks based on information obtained from memory, the clock, and the counter.

22. The game of claim 1, wherein the toy figure includes a code that uniquely identifies the toy figure, the unique code being stored in the memory of the toy figure.

23. A game comprising:
a toy that includes memory for storing information relating to the toy;
an action figure device including:
an input mechanism, and
a controller configured to communicate with the toy, download the stored information relating to the toy, receive input from a user through the input mechanism independently of communication with the toy, alter the stored information based on user input received through the input mechanism and the downloaded information, provide a representation of the toy based on the stored information when the action figure device controller communicates with the toy, and alter the toy representation based on user input received through the input mechanism; and
a game system configured to communicate with the toy, download the stored information relating to the toy, receive input from a user, alter the stored information based on the received input and the downloaded information, provide a representation of the toy based on the stored information, and alter the toy representation.

24. A game comprising:
a toy that includes memory for storing information relating to the toy; and
an action figure device including:
an input mechanism, and
a controller configured to communicate with the toy, download the stored information relating to the toy, receive input from a user through the input mechanism independently of communication with the toy, alter the stored information based on user input received through the input mechanism and the downloaded information, provide a representation of the toy when the action figure device communicates with the toy, and perform a play pattern procedure including altering the representation of the toy based on user input received through the input mechanism.

25. The game of claim 24, wherein the toy includes a code that uniquely identifies the toy.

26. The game of claim 25, further comprising a game system configured to communicate with the toy, download the stored information relating to the toy, receive input from a user, receive the identification code, and alter the stored information based on the received input and code and the downloaded information.

27. The game of claim 26, wherein the game system provides a play pattern the same as a play pattern provided by the action figure device.

28. The game of claim 26, wherein the game system provides a play pattern different from a play pattern provided by the action figure device.

29. The game of claim 25, wherein the code is stored in the toy's memory.

30. The game of claim 24, wherein the action figure device comprises an action figure including:
   a torso; and
   an appendage connected to the torso;
   wherein the appendage is movable relative to the torso.

31. The game of claim 24, wherein the action figure device provides the representation of the toy by emitting an audio representation of the toy.

32. The game of claim 25, wherein the action figure device controller alters the stored information based on the identification code.

33. A game comprising:
   a toy that includes memory for storing information relating to the toy; and
   an action figure including an input mechanism and a controller configured to communicate with the toy, download the stored information relating to the toy, receive input from a user through the input mechanism, alter the stored information based on user input received through the input mechanism and the downloaded information, provide a representation of the toy, and perform a play pattern procedure including altering the representation of the toy based on user input received through the input mechanism.

* * * * *